US012234133B1

United States Patent
Alaqel et al.

(10) Patent No.: US 12,234,133 B1
(45) Date of Patent: Feb. 25, 2025

(54) SKIP HOIST SYSTEM FOR A PARTICLE-BASED HIGH-TEMPERATURE POWER TOWER PLANT

(71) Applicant: KING SAUD UNIVERSITY, Riyadh (SA)

(72) Inventors: Shaker Saeed Mohammed Abdullah Alaqel, Riyadh (SA); Hany Abdurrahman Al-Ansary, Riyadh (SA); Muhammad Mansoor Sarfraz, Atlanta, GA (US); Kenzo Kalonji Repole, Atlanta, GA (US); Eldwin Djajadiwinata, Riyadh (SA); Nader Shaif Saleh, Riyadh (SA); Rageh Saadallah Ali Saeed, Riyadh (SA); Saeed Mohammed Alzahrani, Riyadh (SA); Zeyad Abdulrahman Alsuhaibani, Riyadh (SA); Syed Noman Danish, Riyadh (SA); Abdelrahman Mahmoud Elleathy, Riyadh (SA); Sheldon Jeter, Atlanta, GA (US)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/678,919

(22) Filed: May 30, 2024

(51) Int. Cl.
| | |
|---|---|
| *B65G 25/06* | (2006.01) |
| *B65G 11/20* | (2006.01) |
| *B66D 3/18* | (2006.01) |

(52) U.S. Cl.
CPC ............... *B66D 3/18* (2013.01); *B65G 11/20* (2013.01)

(58) Field of Classification Search
CPC ........ B65G 25/06; B65G 47/18; B65G 47/19; B65G 47/40
See application file for complete search history.

(56) References Cited

U.S. PATENT DOCUMENTS

| | | | | |
|---|---|---|---|---|
| 1,009,038 A | * | 11/1911 | Bathrick | B65G 17/126 |
| | | | | 414/654 |
| 1,341,297 A | * | 5/1920 | Carstarphen | B65G 47/19 |
| | | | | 222/362 |

(Continued)

FOREIGN PATENT DOCUMENTS

| | | |
|---|---|---|
| CN | 2776914 Y | 5/2006 |
| CN | 203094965 U | 7/2013 |

(Continued)

OTHER PUBLICATIONS

"Solid Particle Solar Receivers in the Next-Generation Concentrated Solar Power Plant" by Fuliang Nie, Fengwu Bai, Zhifeng Wang, Xiaobo Li, Ronggui Yang and published on Mar. 23, 2022.

Primary Examiner — Jonathan Snelting
(74) Attorney, Agent, or Firm — Nath, Goldberg & Meyer; Joshua B. Goldberg

(57) ABSTRACT

A skip hoist particle lift system for a particle-based high-temperature power tower plant includes a pre-skip subsystem, an upper hopper disposed above the pre-skip subsystem and separated therefrom, a plurality of elongated guide rails connecting the pre-skip subsystem and the upper hopper to one another, and a skip mounted on the elongated guide rails and configured to be moved therealong between the pre-skip subsystem and the upper hopper. The pre-skip subsystem includes a container configured to accumulate an amount of hot particles therein and to automatically discharge the hot particles into the skip upon arrival of the skip in a loading area of the pre-skip subsystem. The skip is configured to transport the loaded particles upwardly toward the hopper and to subsequently discharge the particles inside of the hopper. Then, the emptied skip is returned to the pre-skip subsystem to repeat the process.

18 Claims, 16 Drawing Sheets

(56) References Cited

U.S. PATENT DOCUMENTS

| | | | | | |
|---|---|---|---|---|---|
| 2,426,304 | A | * | 8/1947 | Hapman | B65G 47/40 |
| | | | | | 198/549 |
| 4,856,640 | A | * | 8/1989 | Beswick | B65G 47/18 |
| | | | | | 198/771 |
| 7,316,333 | B2 | * | 1/2008 | Wegner | B65D 88/005 |
| | | | | | 222/216 |
| 2023/0312272 | A1 | * | 10/2023 | Lunde | G06Q 20/4016 |
| | | | | | 414/403 |

FOREIGN PATENT DOCUMENTS

| | | | |
|---|---|---|---|
| CN | 206768827 | U | 12/2017 |
| CN | 110239879 | A | 9/2019 |
| CN | 109516075 | B | 11/2020 |
| CN | 212173487 | U | 12/2020 |
| CN | 112520316 | A | 3/2021 |
| CN | 114056847 | A | 2/2022 |
| JP | 2007031033 | A | 2/2007 |

* cited by examiner

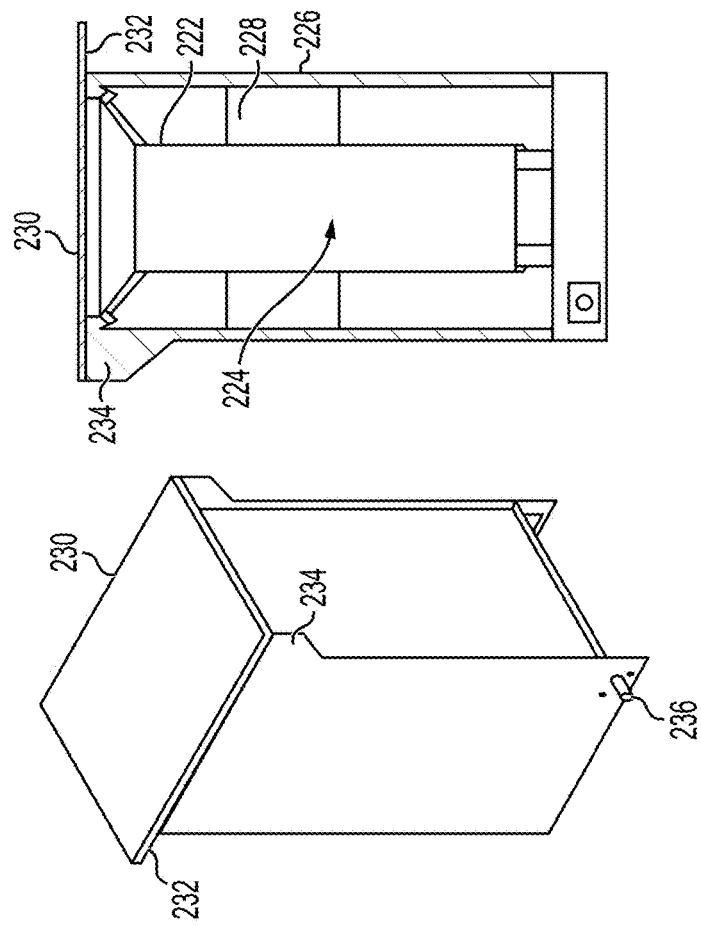
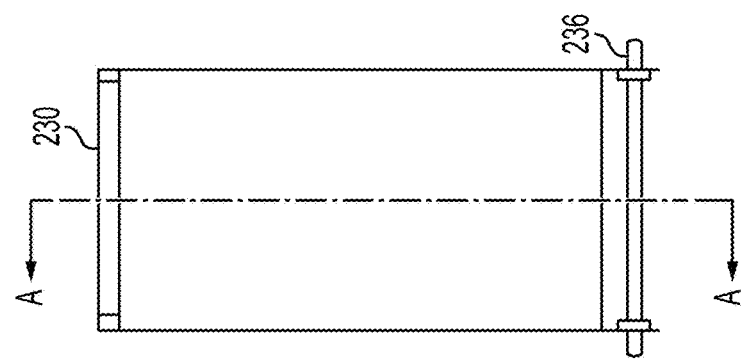
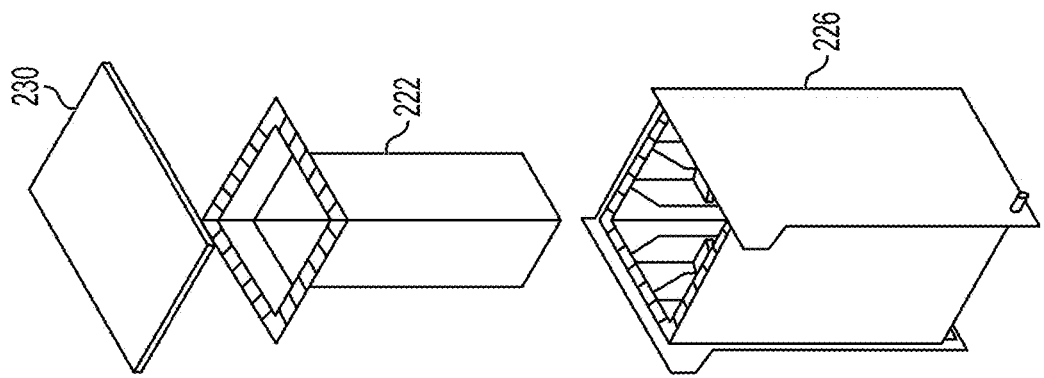
FIG. 5A  FIG. 5B  FIG. 5C  FIG. 5D

SKIP HOIST SYSTEM FOR A PARTICLE-BASED HIGH-TEMPERATURE POWER TOWER PLANT

CROSS-REFERENCE TO RELATED APPLICATION

This application claims priority under 35 U.S.C. § 119 to Provisional Patent Application No. 63/589,926, filed with the U.S.P.T.O. on Oct. 12, 2023, the disclosure of which is incorporated by reference herein in its entirety.

TECHNICAL FIELD

The present disclosure relates to a particle-based high-temperature power tower plant, and more particularly, to a skip hoist system for a particle-based high-temperature power tower plant.

DISCUSSION OF THE RELATED ART

Particle-based concentrating solar power (P-CSP) technology has emerged as a viable and energy-efficient solution, particularly suitable for regions with abundant direct normal irradiance (DNI) like the Middle East and North Africa (MENA). A P-CSP system comprises several essential components, including a particle heating receiver (PHR), a high-temperature thermal energy storage (HT-TES) bin, a particle to fluid heat exchanger (PFHX), a low-temperature thermal energy storage (LT-TES) bin, and a particle lift system (PLS).

The operational cycle of a typical P-CSP system involves the introduction of particles at the top of the PHR, where they are heated to high temperatures by concentrated solar radiation from the heliostat field. These heated particles then flow into the HT-TES bin, where they can be stored for prolonged periods to enable continuous plant operation during periods of low sunlight availability (e.g., night operation or low DNI conditions). Alternatively, they can be directed through the PFHX to drive a power generation cycle. After passing through the PFHX, the particles enter the LT-TES bin before being conveyed back to the top of the PHR via the PLS.

P-CSP technology has the potential to generate dispatchable, carbon-free electricity, provide long-term energy storage, and facilitate high-temperature industrial heat applications. The utilization of particles allows for operation at higher temperatures (approximately 1000° C.), leading to improved thermal efficiencies and reduced costs in CSP applications. However, achieving high-temperature operation in a P-CSP system poses considerable challenges, as all key system components must undergo thorough research, design, and evaluation at elevated temperatures.

Within an HT-PL system, a significant portion of heat loss takes place during the charging and discharging of particles, as they are exposed to ambient temperatures. Additionally, as the capacity of the P-CSP system grows, the height of the tower increases to accommodate larger thermal energy storage systems (TES), particle to fluid heat exchangers (PFHX), and particle heating receivers (PHR). Consequently, the travel time of particles from the charging station to the top of the PHR is extended, leading to increased heat loss through the HT-PL system walls to the surrounding atmosphere. Therefore, it is desirable for the HT-PL system to operate with high efficiency to minimize parasitic heat loss while also being cost-effective, thus enabling competitive electricity pricing for the overall P-CSP plant.

The particle lift system used in a P-CSP plant differs significantly from conventional particle lift systems employed in industries such as construction and mining. The unique operating temperatures, vertical lift requirements, and speed of the particle lift system in a P-CSP plant make conventional lifts unsuitable. Conventional lifts are not scalable to the heights required in P-CSP systems, and their operating environments exceed their feasible temperature limits. Moreover, efficiency, reliability, and cost-effectiveness are crucial factors that differentiate a particle lift system for P-CSP from conventional lifts.

Extensive research has been conducted worldwide to identify and investigate suitable particle lift systems for P-CSP plants. Researchers have explored options such as bucket elevators, conveyor belts, Old's elevators, and skip hoists commonly used in the mining industry. However, preliminary investigations conducted by our research group at have identified several alternatives to skip hoists, which were found to be unsuitable or underdeveloped.

Screw-type particle lift systems, such as Old's elevators, utilize a rotating outer drum to pull particles up an internal helix through friction. While they can handle particles at higher temperatures (up to 800° C.) without interruption, the cost of Old's elevators increases linearly with the height of the tower. Their lifting efficiency has been calculated to be only 5%, and the excessive particle attrition and wear caused by friction result in significantly lower energy efficiency compared to bucket elevators or skip hoists.

Sandia National Laboratories (SNL) has conducted evaluations of various particle lift systems, with a particular focus on bucket elevators (BE). BEs have the advantage of being able to operate at moderately high temperatures (>200° C.) and offer continuous particle discharge. However, BEs are prone to high heat losses due to the large surface area exposed to the heated particles. It is challenging to mitigate this heat loss by providing sufficient insulation around the housing of the bucket elevator. Research conducted at the Georgia Institute of Technology (GIT) indicates that a reasonable amount of heat loss is expected at 300° C., which is the minimum particle temperature in a baseline design. Furthermore, studies have shown that conventional bucket elevators often experience issues such as backflow and high spillage during operation. These factors can negatively impact the efficiency and reliability of the system. Additionally, meeting the requirements of high mass flow rates (approximately 1000 kg/s) and lift heights (~250 m) for large-scale commercial CSP plants (around 100 MWe) can be challenging using commercially available bucket elevator systems.

Conveyor belts have the advantage of minimal spillage, but they are challenging to integrate into the power tower structure and cannot operate at elevated temperatures required for P-CSP applications.

These challenges highlight the need for innovative designs and modifications to existing particle lift systems to address the specific requirements and limitations of P-CSP applications.

SUMMARY

The present disclosure relates to a skip hoist system of a particle-based high-temperature power tower plant. Once the particles have already passed through a heat exchanger of the power plant, the particles are lifted back up to an upper hopper of the skip hoist system for further use. A pre-skip station (or pre-skip subsystem, hereinafter referred to as "pre-skip") is a component of the skip hoist system that is used for loading the hot particles of the power plant that are lifted back to the upper hopper via a skip.

The temperature of the particles that are loaded in the pre-skip may range, for example, from about ambient temperature to about 1000° C. In a non-limiting embodiment, the temperature of the particles that are loaded in the pre-skip may range, for example, from about 500° C. to about 650° C.

The skip is an insulated chamber hoisted up and down a set of rails (traveling between the pre-skip station and the upper hopper) by a winder, a motor or the like for transporting the particles from the pre-skip to the upper hopper and dumping them inside of the upper hopper.

The particles that have already passed through the heat exchanger of the power plant (and are temporarily located in the pre-skip) are still hot as the heat exchanger does not cool them entirely to ambient temperature. Since these particles in the upper hopper are re-heated or re-used for other operations that require heat exchange, it is important to reduce their heat loss on the trip up to the upper hopper by as much as possible. To this end, the present disclosure provides a skip hoist system that minimizes the loss of heat in the particles at every step of the way to the upper hopper.

Particularly, the pre-skip is configured to preserve as much heat as possible in the particles that are loaded into the skip. This is achieved by equipping the pre-skip with an insulated particle storage chamber having a chute installed at its downstream end. The chute is configured to open automatically when the skip arrives to the pre-skip area for loading. The opening of the chute enables the particles stored in the storage area of the pre-skip to be dumped into the skip.

In addition, the pre-skip also includes a mechanism for automatically opening the lid of the skip when the skip is stationed for loading in the pre-skip area. This way, a correct quantity of particles (defined by the interior storage area of the pre-skip) can be dumped into the skip quickly. This reduces the amount of time that the particles are exposed to the cooler ambient temperature, thereby reducing heat loss in the particles.

The skip is configured to have its lid automatically closed by gravity (e.g., via its own weight) immediately upon leaving the pre-skip loading area when being hoisted upwardly toward the upper hopper (on rails).

A weight-and-pulley system is utilized to automatically and immediately close the chute of the pre-skip when the skip departs the pre-skip loading area. This closes the storage chamber of the pre-skip such that it can be filled again with additional particles that are subsequently carried up to the upper hopper.

Advantageously, the above process of automatically filling the skip with particles at the pre-skip area is carried out without using any dedicated electrical components. That is, the structural configuration of the pre-skip area and the structural configuration of the skip, combined with the up-down travel of the skip along the rails (as powered by the winder), is all that is needed to automatically fill the skip in the pre-skip loading area and to automatically close the chute and the lid of the skip when the skip is hoisted upwardly.

In other words, the process of opening the chute, closing the chute, opening the lid of the skip and closing the lid of the skip are automatically carried out solely by virtue of the arrival and departure of the skip to/from the pre-skip loading area in combination with the effect of gravity on the weight-and-pulley system. This configuration simplifies the electrical system of the power plant by doing away with any electrically operated components that would otherwise be needed for filling and emptying the skip. This, in turn, reduces the design, operational and maintenance costs associated with the use of additional electrical components for controlling the filling process of the skip.

The rails on which the skip travels upwardly (relative to the altitude of the pre-skip) toward the hopper are configured to insert the skip partially inside of the upper hopper and to turn the skip upside down into the hopper such that the skip can quickly dump its contents in the upper hopper. Advantageously, the lid of skip is hinged in a way that enables it to be opened automatically by gravity (e.g., from its own weight) inside of the upper hopper due to the skip being turned upside down, thereby, further simplifying the configuration of the skip system. In addition, the lid is also configured to be closed by gravity due to its own weight when the skip is ejected from the upper hopper and is rearranged with its lid side up.

The emptied skip can then be lowered down to the skip pre-skip loading area again to repeat the process.

BRIEF DESCRIPTION OF THE DRAWINGS

The above and other features of the present invention will become more apparent by describing in detail exemplary embodiments thereof in conjunction with the accompanying drawings, in which:

FIG. 5A is an exploded perspective view illustrating the skip subsystem of FIG. 4;

FIG. 5B is a rear view illustrating the skip subsystem of FIG. 5A;

FIG. 5C is a perspective view illustrating the skip sub-system of FIG. 5A;

FIG. 5D is a cross-sectional view taken along the line A-A of FIG. 5B;

DETAILED DESCRIPTION OF THE EMBODIMENTS

Figure 2:
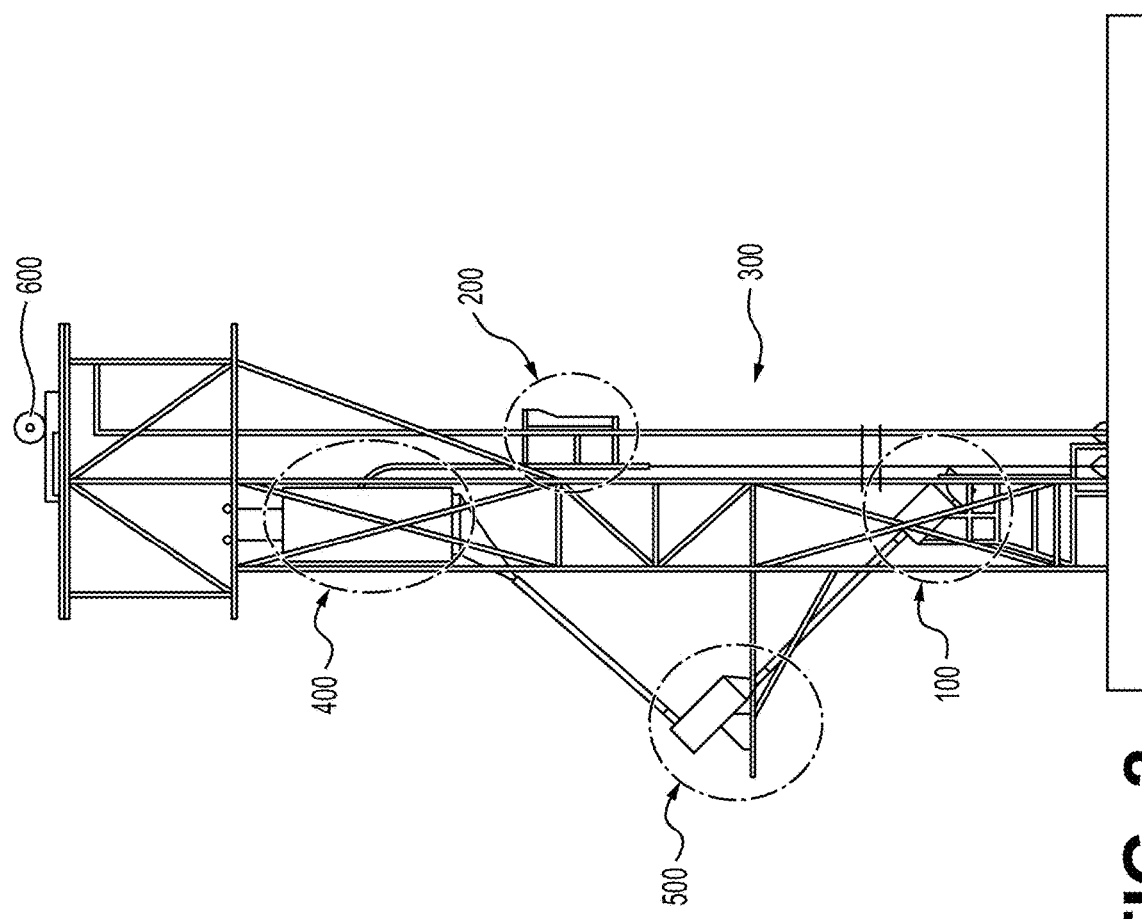
FIG. 2 is a side view illustrating the skip hoist system of FIG. 1.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

As described above, the present disclosure relates to a skip hoist system for use in a particle-based high-temperature power tower plant. The skip hoist system includes a pre-skip subsystem configured to store a given quantity of hot particles therein and to automatically discharge the particles into an empty skip placed in a loading area in front of the pre-skip subsystem.

The discharging end of the storage container of the pre-skip subsystem is configured to be automatically closed by a hinged chute when the loaded skip is then moved upwardly to dump the particles into an upper hopper of the skip system. A gravity-powered weight-and-pulley system is used to automatically open and close the chute based on the movements of the skip. The opening and closing of a lid of the skip (enabling the skip to be filled and emptied) is dependent only on the movement of the skip along a pair of rails linking the pre-skip subsystem with the upper hopper. Therefore, no separate electrical components are utilized to open and close the chute and no separate electrical components are used to open and close the lid of the skip during operation of the skip hoist system. This configuration is advantageous and will be described in more detail below.

FIGS. 1-6C illustrate a skip hoist system for use in a particle-based high-temperature power tower plant according to an embodiment of the present invention.

Figure 1:
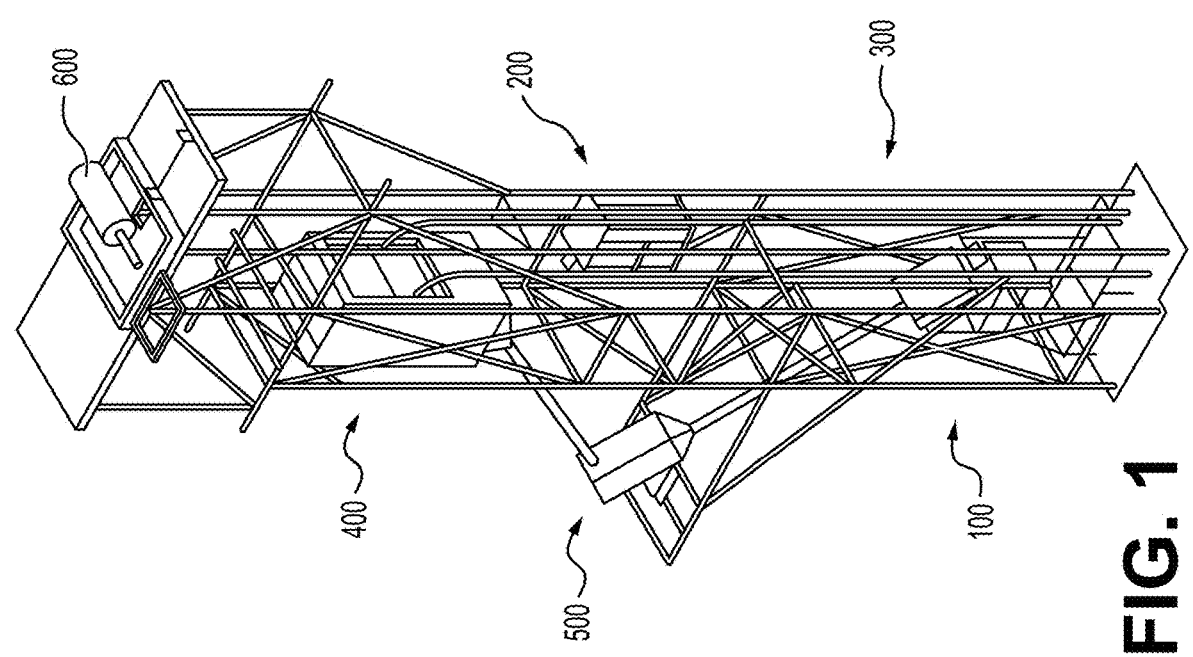
FIG. 1 is a perspective view illustrating a skip hoist system for a particle-based high-temperature power tower plant according to an embodiment of the present subject matter.

FIGS. 1 and 2 illustrate the overall structure of the skip hoist system of the present subject matter, which includes a pre-skip subsystem 100 (or simply "pre-skip"), an upper hopper 400 (or simply "hopper") disposed at a higher elevation than the pre-skip 100, a plurality of rails 300 connecting the pre-skip 100 with the hopper 400, a skip subsystem 200 (or simply "skip") connected to the rails 300 and movable therealong between the pre-skip 100 and the hopper 400, a storage tank 500 in fluid communication with the hopper 400, and a winder 600 connected to the skip 200 via a cable 700 for moving the skip 200 along the rails 300.

The storage tank 500 may be a low-temperature thermal energy storage (LT-TES) bin, receiving particles that have already been processed by a thermal exchanger of a power plant serviced by the skip hoist system. In FIGS. 1 and 2 the storage tank 500 is illustrated as being in fluid communication with the hopper 400 and the pre-skip 100. However, this configuration is non-limiting, and the upper hopper 400 may be used to convey the particles stored therein to other components of the power plant. The tank 500 may be configured to feed low-temperature (but still hot) particles to pre-skip 100.

The pre-skip 100 is configured to accumulate a load of particles therein (particles received, for example, from the storage tank 500) and to automatically discharge the accumulated load into the skip 200 when the skip 200 is brought into a loading position along the rails 300 (in front of the pre-skip 100). FIGS. 3H, 3I and 3J illustrate the skip 200 in the loading position.

Figure 3A:
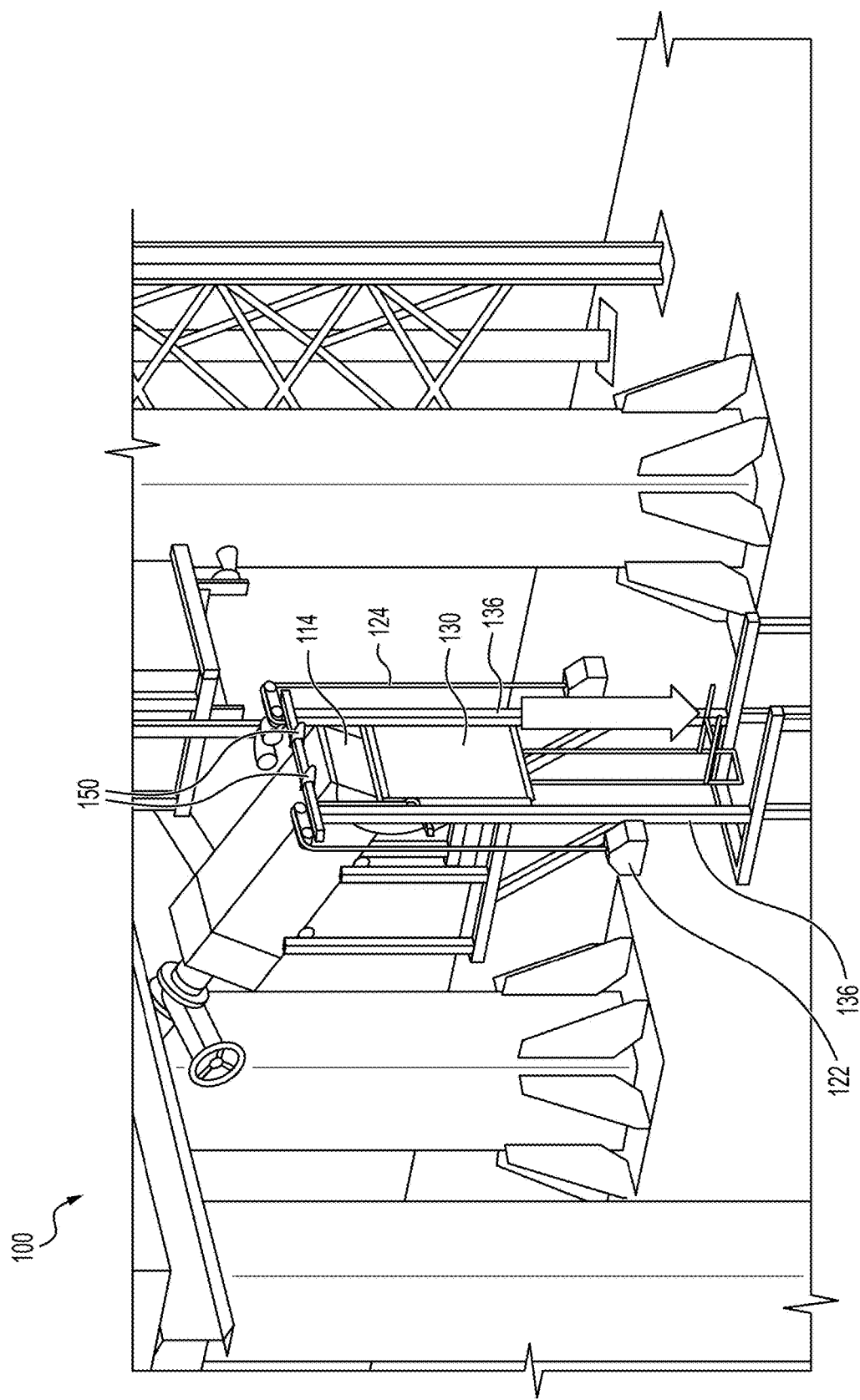
FIG. 3A is a perspective view illustrating a pre-skip subsystem of the skip hoist system of FIG. 1.
Figure 3B:
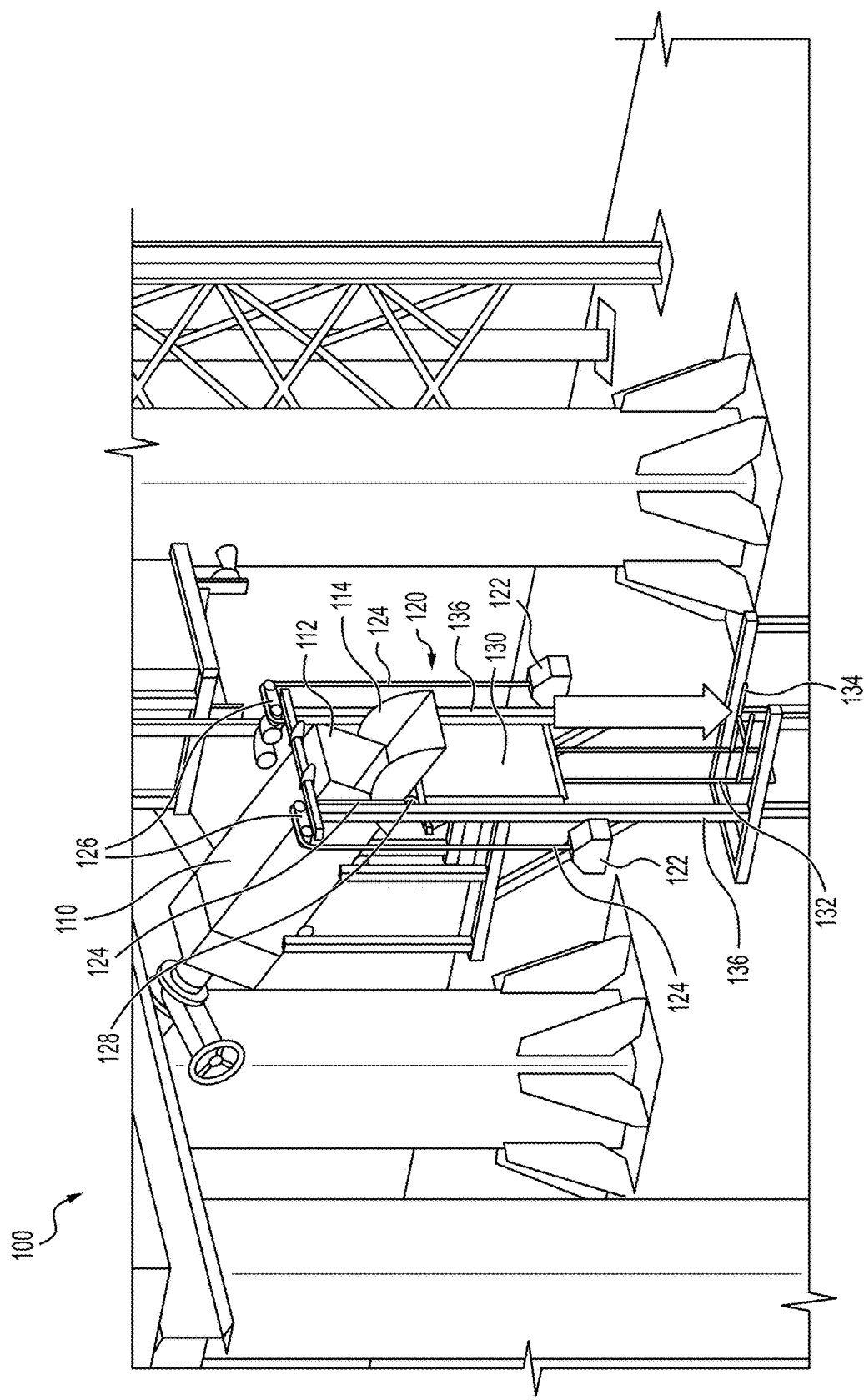
FIG. 3B is a perspective view illustrating a pre-skip subsystem of the skip hoist system of FIG. 1.

FIGS. 3A and 3B illustrate the pre-skip 100 in its entirety. FIGS. 3C-3L illustrate only some components of the pre-skip 100 for clarity purposes.

Figure 3C:
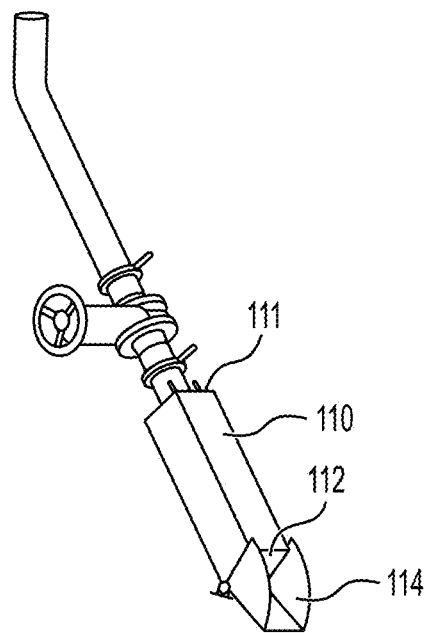
FIG. 3C is a perspective view illustrating a part of the pre-skip subsystem of FIG. 3A.
Figure 3D:
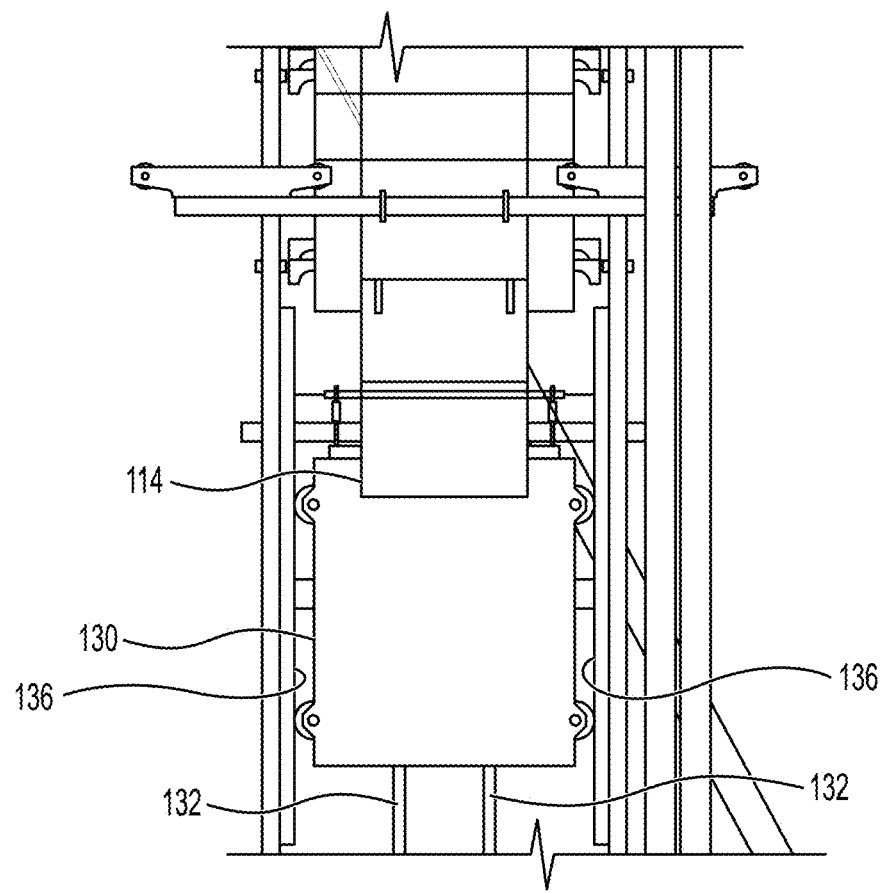
FIG. 3D is a front view illustrating a part of the pre-skip subsystem of FIG. 3A.

Referring to FIGS. 3B-3C, the pre-skip 100 includes a storage container 110 (or "pre-skip body") that has an intake end 111 with filling port, a discharging end 112 opposite to the intake end 111, and a hollow body extending between the intake end 111 and the discharging end 112, thereof, a chute 114 pivotally hollow body of the container 110 adjacent to the discharging end 112, and a weight-and-pulley mechanism 120 (see FIG. 3B). The container 110 may extend in a downward inclination from the intake end 111 thereof to the discharging end 112 thereof to facilitate the discharging of the particles into the skip 200.

The storage container 110 may have an inner liner and outer cladding. The inner liner and outer cladding of the container 110 may be separated by a layer of insulating material in order to reduce the heat loss of the particles while being stored in the container 110. The insulating material may be, for example, steel wool, ceramic wool, fiberglass, or other types of suitable insulators.

The hollow storage container 110 may have an internal storage volume capacity that is equal to that of the skip 200. This way, the storage container 110 can be used to quickly and efficiently fill the skip 200 with particles in one dumping process. This reduces waste of thermal energy during the dumping process. Alternatively, or in addition, the container 110 can have a storage capacity that is less than that of the skip 200 or greater than the storage capacity of the skip 200.

A pivot of the chute 114 can be connected at a bottom edge of the discharge end 112, as illustrated in FIG. 3C. This enables the chute 114 to be pivoted between an open state, as illustrated in FIG. 3B in order to open the discharging end 112 of the container 100 to enable the particles stored in the container 100 to be dumped into the skip 200 (e.g., by falling down due to gravity and the downwardly incline of the storage container 100), and a closed state, as illustrated in FIGS. 3A and 3K in order to close the discharging end 112 of the container 100 after the dumping process has been completed.

The storage container 110 may include a diaphragm (e.g., perforated plate, see FIG. 3F) disposed inside of its hollow body and just downstream of a filling port connected to the end 111 of the container 110. This configuration slows down the filling rate of the container 110, which in turn, facilitates the closing of the pivoting chute 114.

Figure 3E:
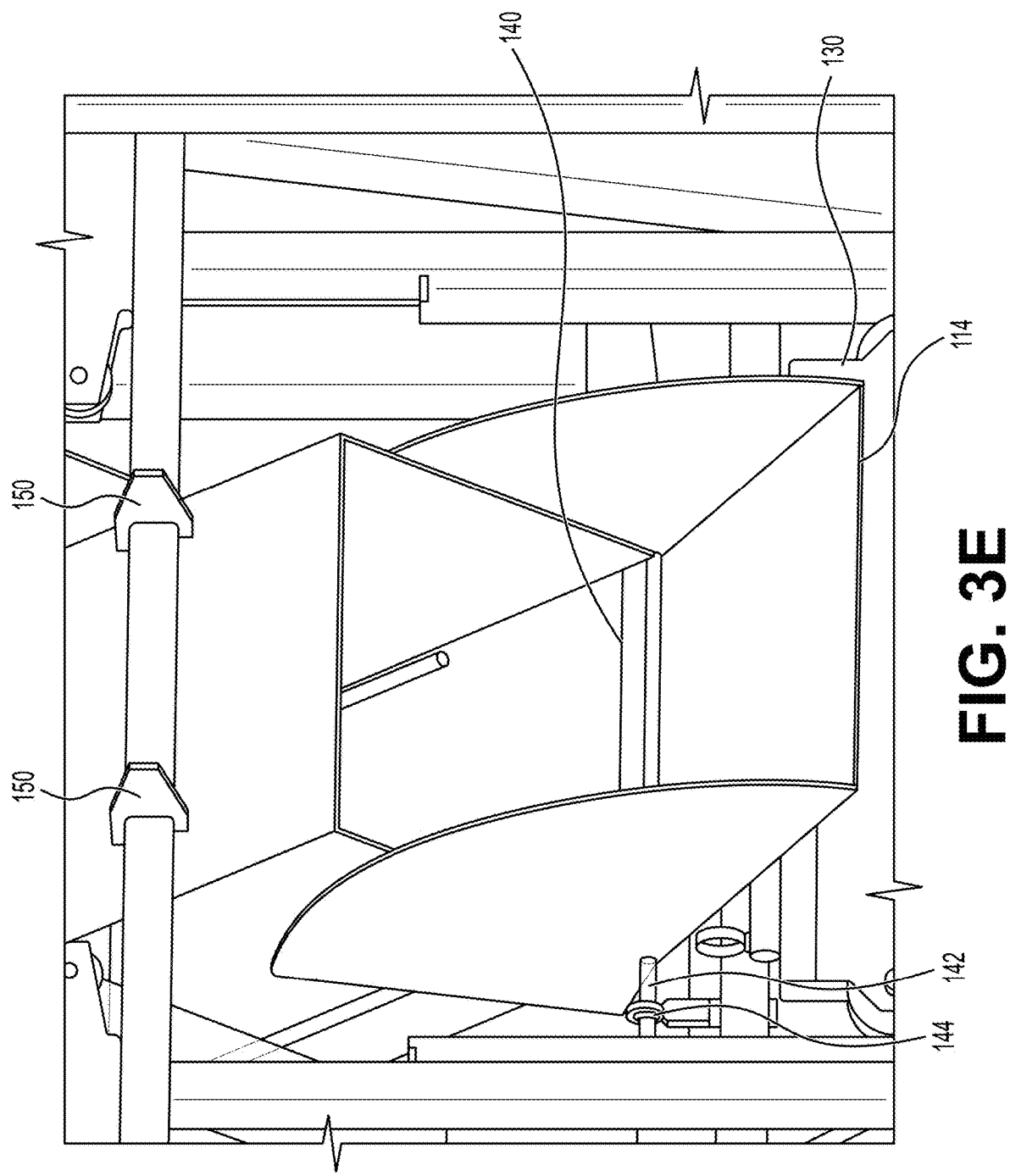
FIG. 3E is a perspective view illustrating a part of the pre-skip subsystem of FIG. 3A.
Figure 3F:
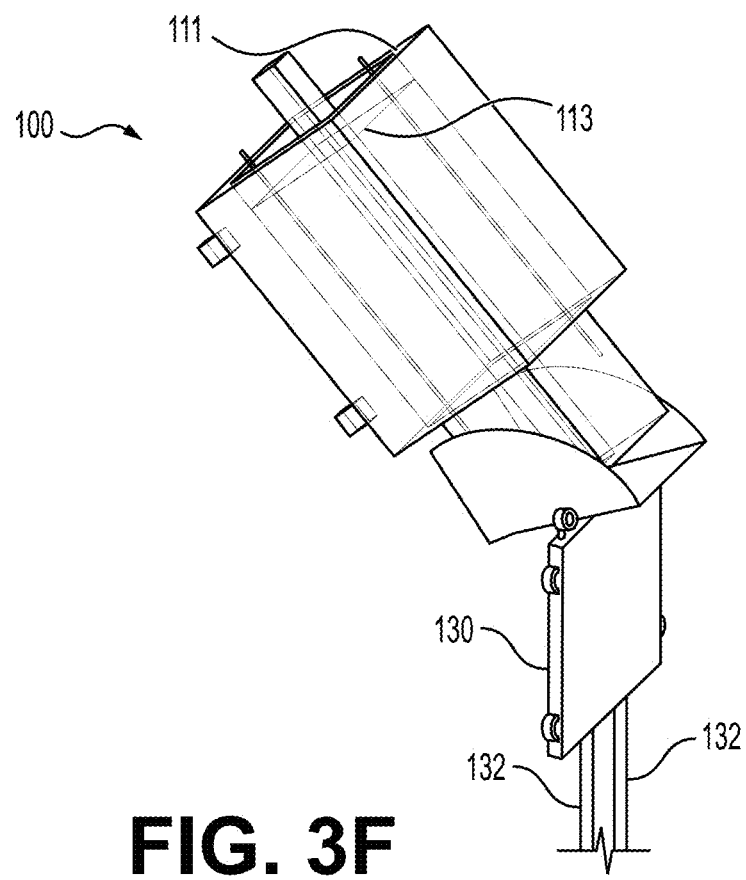
FIG. 3F is a perspective view illustrating a part of the pre-skip subsystem of FIG. 3A.
Figure 3G:
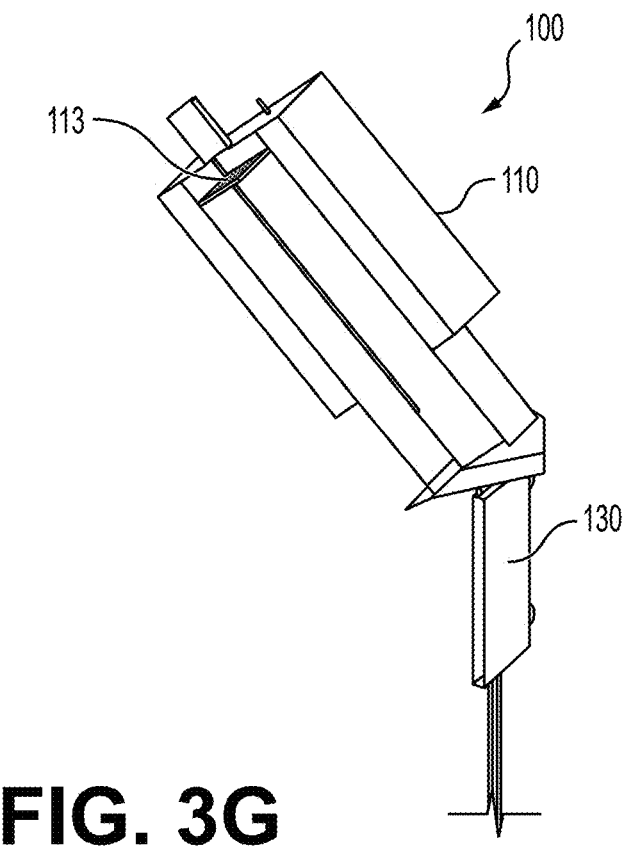
FIG. 3G is a perspective view illustrating a part of the pre-skip subsystem of FIG. 3A.
Figure 3H:
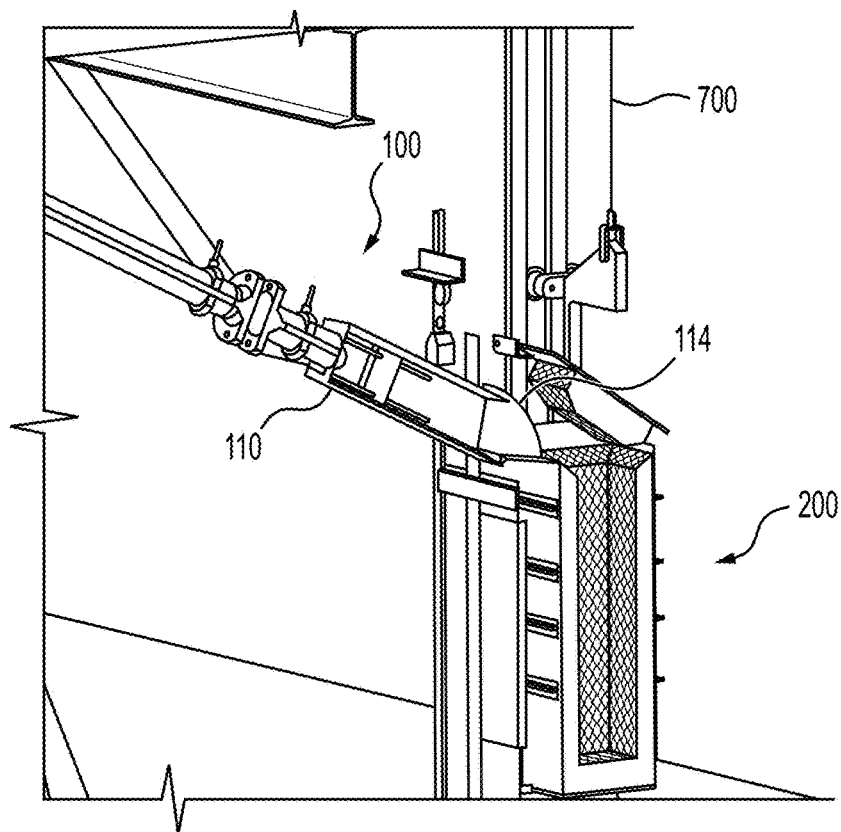
FIG. 3H is a perspective view illustrating a part of the pre-skip subsystem of FIG. 3A.
Figure 3I:
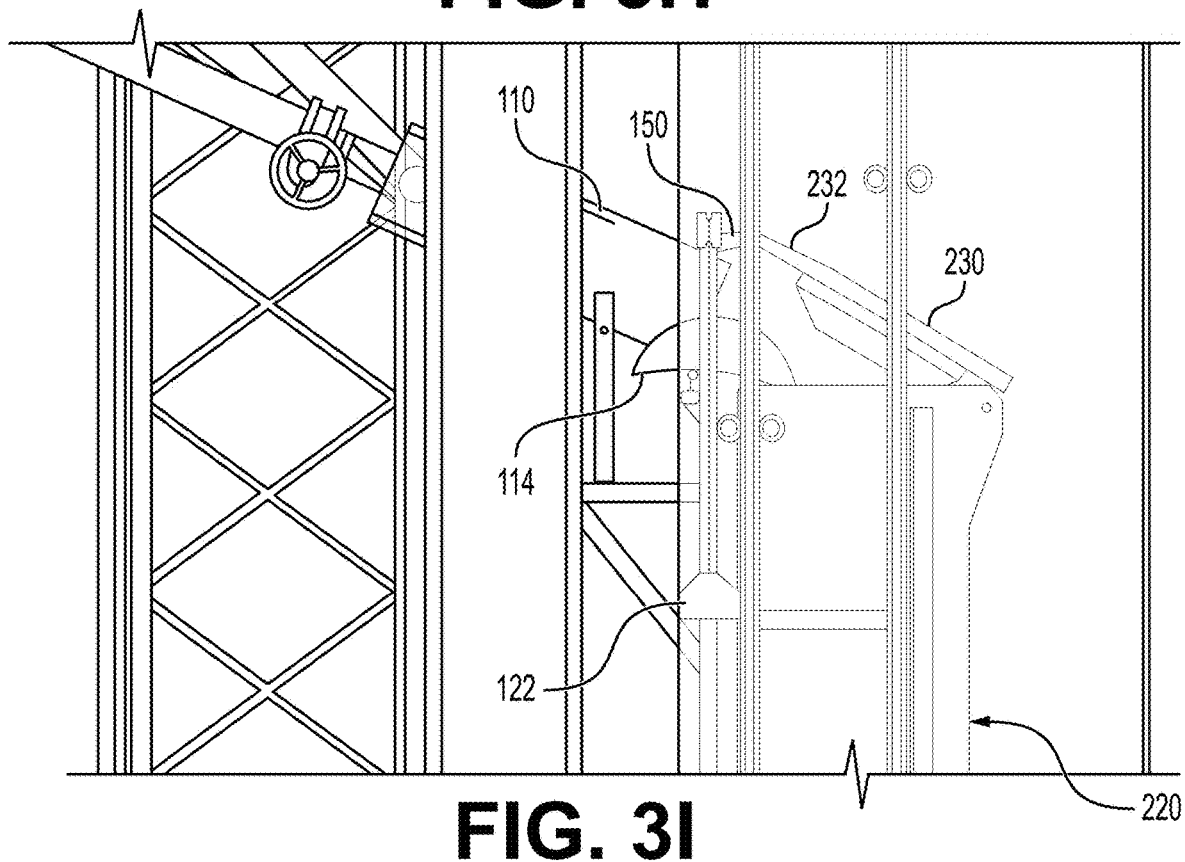
FIG. 3I is a side view illustrating a part of the pre-skip subsystem of FIG. 3A.
Figure 3J:
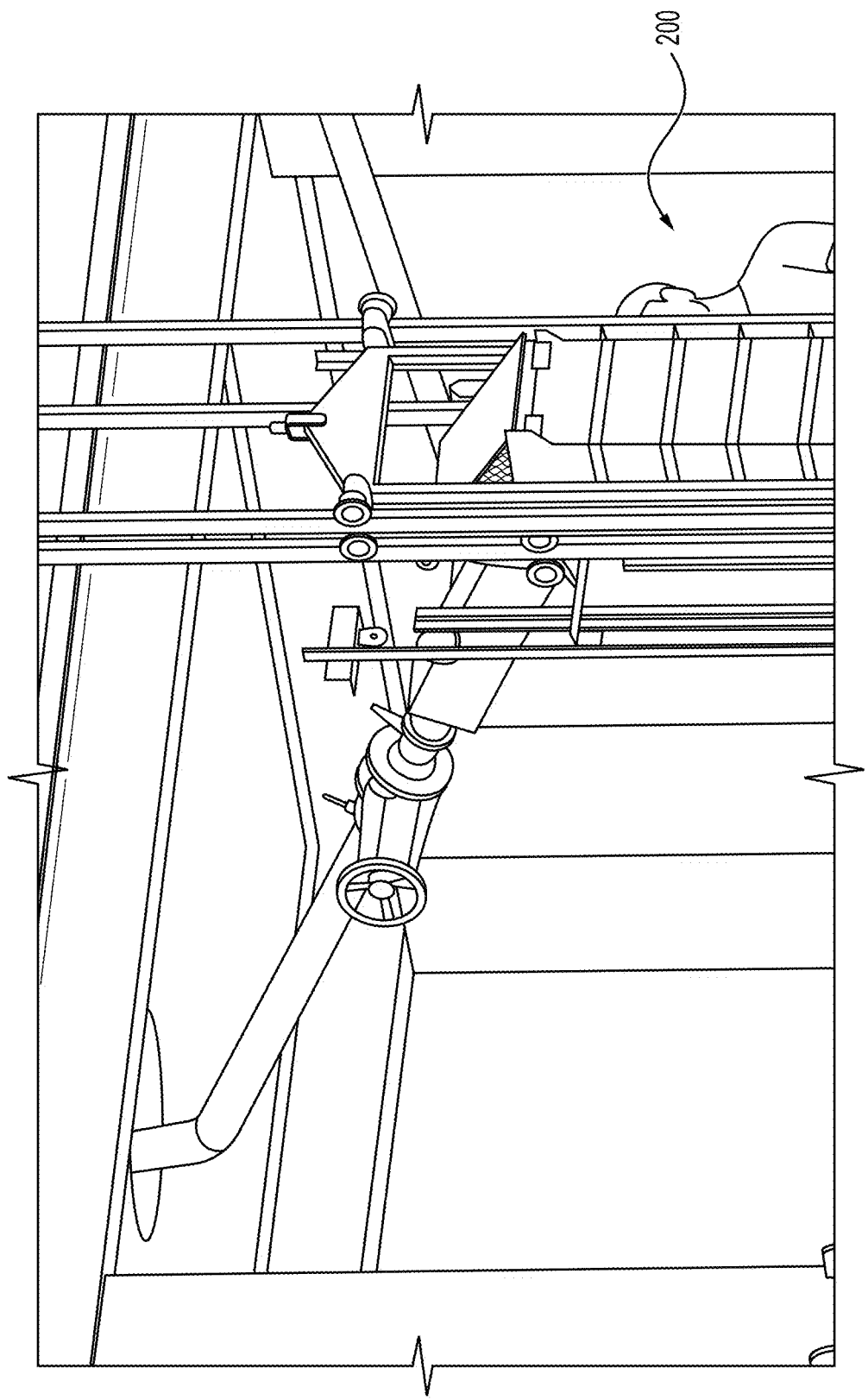
FIG. 3J is a perspective view illustrating a part of the pre-skip subsystem of FIG. 3A.

Referring to FIG. 3E, the pivoting mechanism of the chute 114 may include a longitudinal rod 142 extending across the bottom of the discharge end 112 of the container 110, and the rod 142 may be connected to a pair of bearings 144 for structural support and to enable the chute 114 to be rotated between the open and the closed positions. In addition, the storage container 110 may include a sealing strip 140 extending over the rod 142 in order to protect the rod 142 from being contaminated by the particles when the particles are being discharged into the skip 200. This configuration can reduce the likelihood of having the pivoting joint jamming due to contamination by the particles. The sealing strip 140 may be made of a metal in order to resist the temperature of the particles.

The weight-and-pulley mechanism (or simply "mechanism") 120 can be used to automatically open the chute 114 immediately upon the arrival of the skip 200 into the loading position along the rails 300 and to automatically close the chute 114 immediately upon the departure of skip 200 from the loading position.

Referring to FIG. 3B, the mechanism 120 may include a pair of substantially vertical rails 136 spaced apart from one another, a plate 130 (or "door") connected to the rails 136 and configured to be moved up and down along the length of the rails 136, a pair of flexible cables 124, each of which having one end thereof connected to a weight (or mass) 122 and the other end attached to a respective side of an upper end of the plate 130 via a hook 128, each cable 124 passing through a respective pulley 126, each pulley 126 being disposed above the pivoting joint of the chute 114, and a platform 134 connected to a bottom end of the plate 130 via a connecting member 132.

The opening and closing of the chute 114 is effectuated by sliding the plate 130 downwardly and upwardly on the rails 136.

In the closed chute 114 position, as illustrated in FIG. 3A, the plate 130 contacts an outside surface of the chute 114 and presses upwardly against the outside surface of the chute 130 in order to keep the chute 114 pressed against the open end 112 of the container 110 (i.e., to keep the container 110 closed). The upwardly force that the plate 130 exerts on the chute 114 results from the weight of the hanging masses 122, and is transferred to the plate 130 via the cables 124.

In order to open the chute 114, the plate 130 must be moved downwardly from its position as illustrated in FIG. 3A (e.g., the top of the plate 130 must be moved below the hinge of the chute 114). This operation can be performed by using the weight of the skip 200. That is, when the skip 200 is descending toward the pre-skip 100 loading area (but has not yet reached the pre-skip 100 loading area), the bottom of the skip 200 contacts the platform 134 of the mechanism 120 since the platform 134 protrudes into the travel path of the skip 200. After making contact, the additional downwardly movement of the skip 200 (that is needed to bring the skip 200 into the pre-skip 100 into loading area) moves the platform 134 downwardly by a certain amount. This downward movement overcomes the weight of the masses 122, thereby pulling the plate 130 downwardly. The downward movement of the plate 130 removes the plate 130 from the pivoting path of the chute 114, thereby enabling the chute 114 to freely open by the effect of gravity thereon (since the chute 114 may be tilted with respect to a vertical axis) and/or by the weight of the particles inside of the container 110 (which press outwardly against an inside surface of the chute 114).

When the skip 200 has been filled and is moved away from the pre-skip 100 loading area, thereby no longer weighing down on the platform 134, the weight of the hanging masses 122 causes the plate 130 to be lifted up automatically (e.g., the masses 122 are heavier than the plate 130). This, in turn, closes the chute 114 and maintains it shut as described above.

This configuration uses only the motion of the skip 200 in combination with a gravity-controlled weight-and-pulley mechanism to open and close the chute 114, thereby doing away with any separate electrical motors that would otherwise be required to open and close the chute 114. This, in turn, reduces design costs, operating costs and maintenance costs for the power plant. In addition, the configuration of the pre-skip 100 of the present invention provides a secure enclosure of the particles inside of the container 110 of the pre-skip 100 because the weights 122 are designed to be of a magnitude that is large enough to securely keep the chute 114 in the closed position when the skip 200 is not present, yet small enough to be overcome by the weight of an empty skip 200 in order to reliably open the chute 114 when the skip 200 arrives at the loading position of the pre-skip 100.

The pre-skip 100 also includes one or more lid-opening elements 150 (see FIG. 3E) disposed above the discharge end 112 of the container 110. The elements 150 (or "protrusions") are supported by the structure of the pre-skip 100 (or by the structure of the power plant generally), and extend toward the skip 200 (when the skip 200 is present at the loading position of the pre-skip 110). The protrusions 150 are configured to automatically open a lid of the skip 200 when the skip arrives at the loading position of the pre-skip 100 in order to enable the pre-skip 100 to fill the open skip 200 with particles. The opened lid of the skip 200 closes automatically due to its own weight when the loaded skip 200 is moved upwardly from the loading position (and therefore the protrusions 150 disengage with the lid of the skip 200) This configuration will be described in more detail below with reference to FIGS. 4 and 5A-5D.

Figure 4:
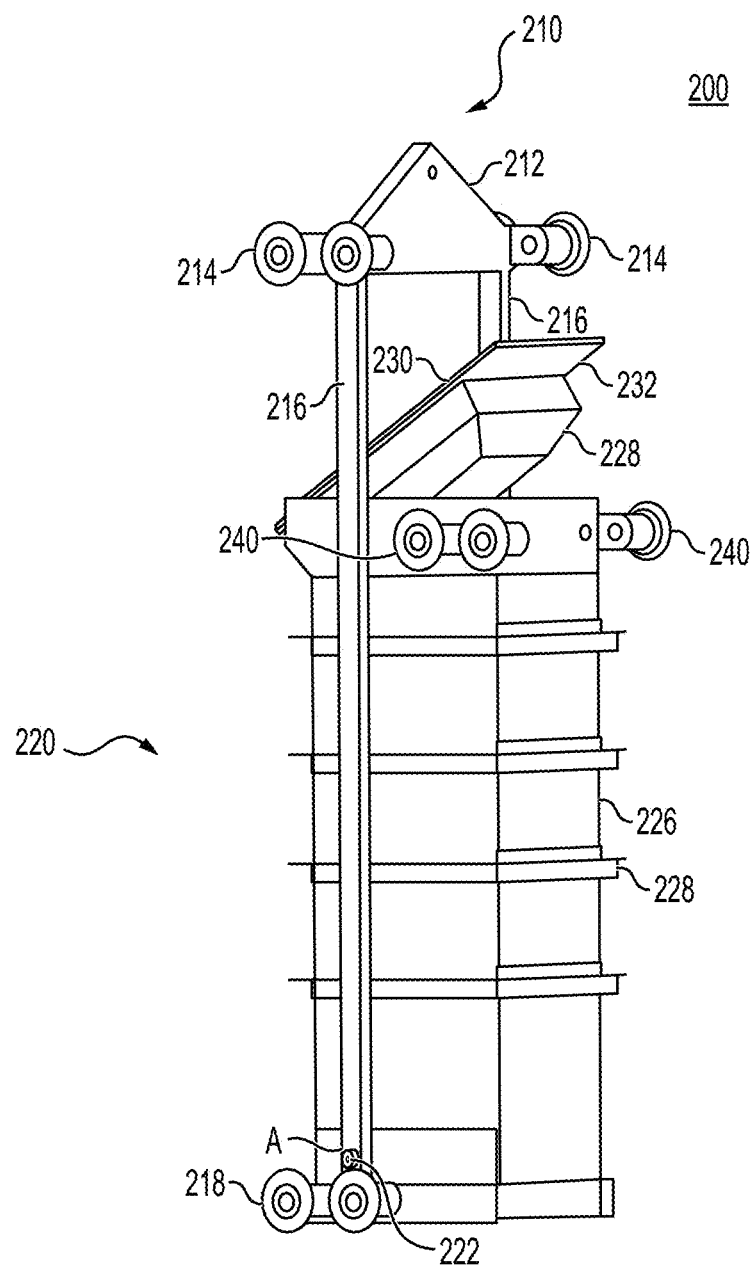
FIG. 4 is a perspective view illustrating a skip sub-system of the skip hoist system of FIG. 1.

Referring to FIG. 4, the skip 200 includes a bail 210 and an insulated skip container 220 pivotally connected to one another at a location below mid-height of the container 220 (which may be near the bottom of the container 220 as illustrated by location "A" in FIG. 4).

FIGS. 5A-5D are detailed views of the container 220 but they omit some components of the container 220 (which are illustrated in FIG. 4) for convenience of illustration.

Referring to FIGS. 4 and 5A-5D, the skip container 220 may include an inner lining 222 defining an interior storage area 224 in the container 200, an outer cladding 226 defining an exterior of the container 220 and containing the inner lining 222 therein, an insulating material 228 surrounding the liner 222 all-around, a lid 230 with an overhang 232 at a front portion of the container 220 and a hinge 234 located at a rear portion of the container 200, a rod 236 extending outwardly from a pair of opposing sidewalls of the cladding 226, a plurality of miter joined flanges 238 (see FIG. 4) on the outside of the outer cladding 226, and pairs of rollers 240 attached to opposite side surfaces of the container 220 and located adjacent to a top front region of the container 220.

As illustrated in FIGS. 4 and 5D, the lid 230 may also be provided with insulative material 228 attached thereto in order to insulate the top of the container 220 in the closed position. The insulation 228 may be, for example, ceramic wool or other types of insulators commonly used in the industry.

The miter joined flanges 238 act as fasteners. They will hold the skip 200 in place during thermal expansion and contraction that the skip 200 experiences during loading and unloading of the particles.

The skip 200 may be configured to be wider rather than deeper. This will enable it to be discharged rapidly, thereby, reducing heat loss in the particles during discharge into the hopper 400.

Figure 6A:
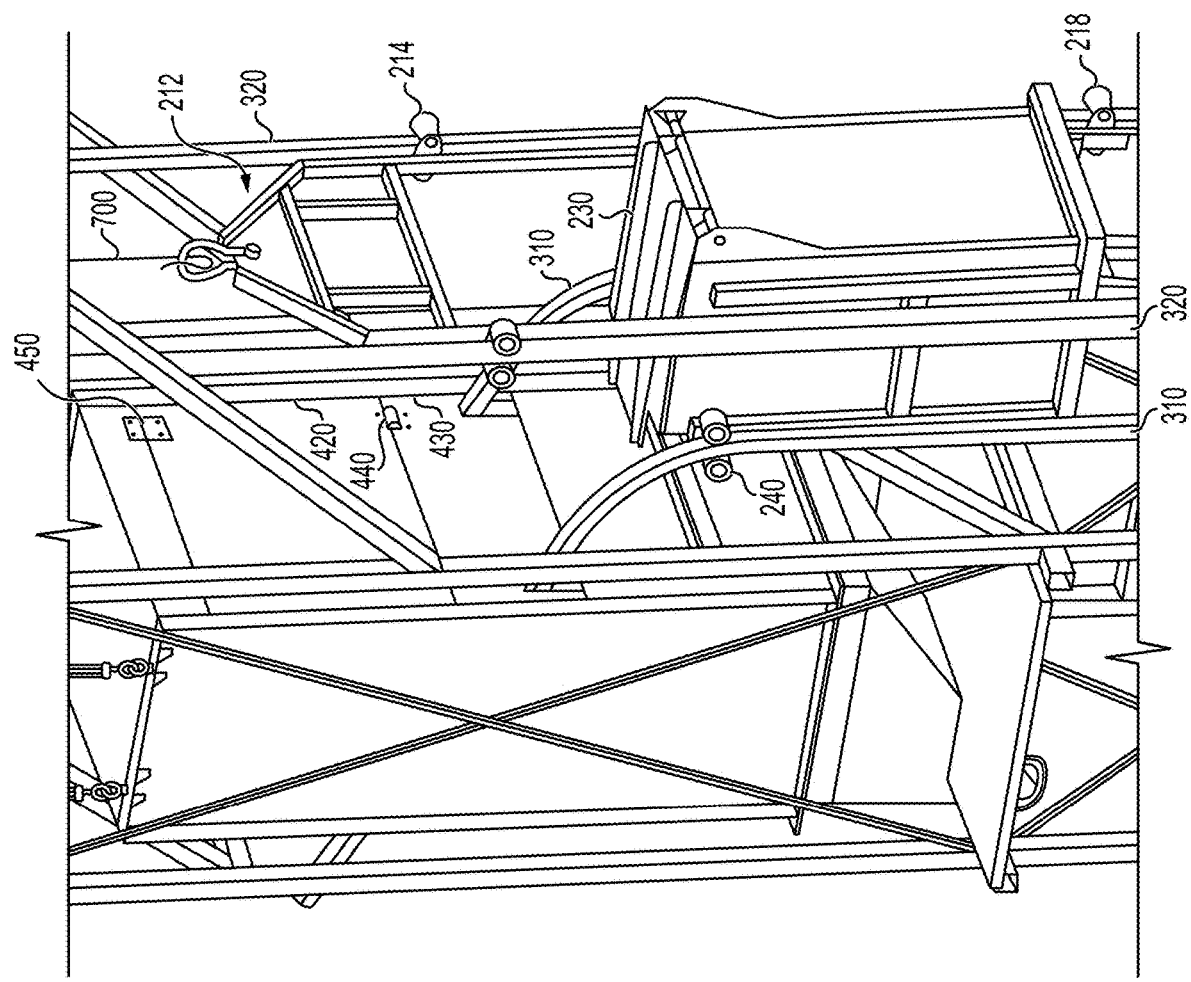
FIG. 6A is a perspective view illustrating an upper hopper of the skip hoist system of FIG. 1.

Referring to FIG. 4, the bail 210 may include a headpiece 212 with pairs of rollers 214 attached to opposite sides of the headpiece 212, a pair of elongated members 216 extending downwardly from the headpiece 212 toward the bottom of the container 220, and pairs of rollers 218 attached to a bottom region of the elongated members 216. Each elongated member 216 may have a corresponding through hole or a bearing disposed in location "A". Each said through hole or bearing may be located above the rollers 218 when the skip 200 is aligned in the upright position as illustrated in FIG. 4. In addition, each said through hole or bearing receives a respective protrusion of the rod 236 therein in order to rotatably connect the bail 210 with the skip container 220. The headpiece 212 is connected to the cable 700 as illustrated in FIG. 6A in order to utilize the power of the winder 600 to move the skip 200 along the rails 300.

The mechanism for opening the lid 230 of the skip 200 will now be described with reference to FIGS. 3K and 3L. As illustrated in FIG. 3K, the protrusions 150 (more clearly illustrated in FIG. 3E), make contact with the overhang 232 of the lid 230 of the skip 200 when the skip 200 approaches the pre-skip 100 loading area. As the skip 200 continues to travel downwardly on the rails 300, the lid 230 starts to open by the rotation of the lid 230 relative to the hinge 234 (since the overhang 232 is maintained in place by the protrusions 150). This is illustrated in FIG. 3L.

This configuration automates the opening and closing of the lid 230 in a safe, secure and reliable manner simply by moving the skip 200 in and out of the pre-skip 100 loading area, which is an indispensable step of operating a skip hoist system for a particle-based high-temperature power tower plant. Therefore, this configuration cuts costs associated with designing, installing and maintaining a separate electric motor for opening and closing the lid 230 of the container 220.

In addition, the fact that the lid 230 is already opened prior to the opening of the chute 114 increases the reliability of the particle-loading operation because it ensures that the skip container 220 is ready to receive the particles inside of it prior to the chute 114 being opened.

Figure 3L:
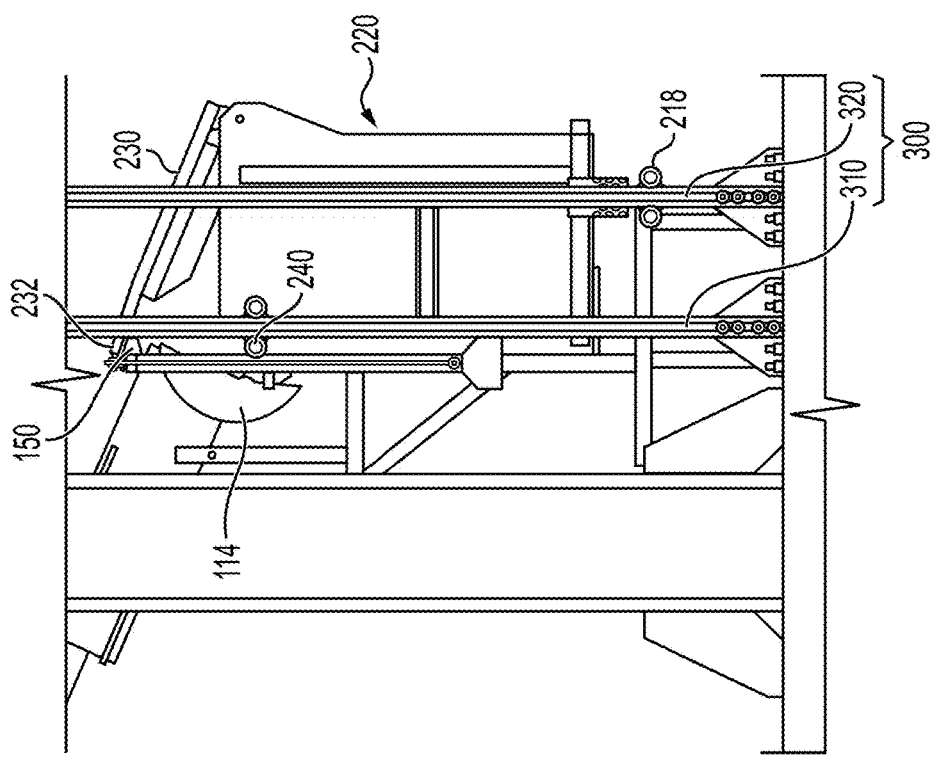
FIG. 3L is a side view illustrating the pre-skip subsystem of FIG. 3A.
Figure 3K:
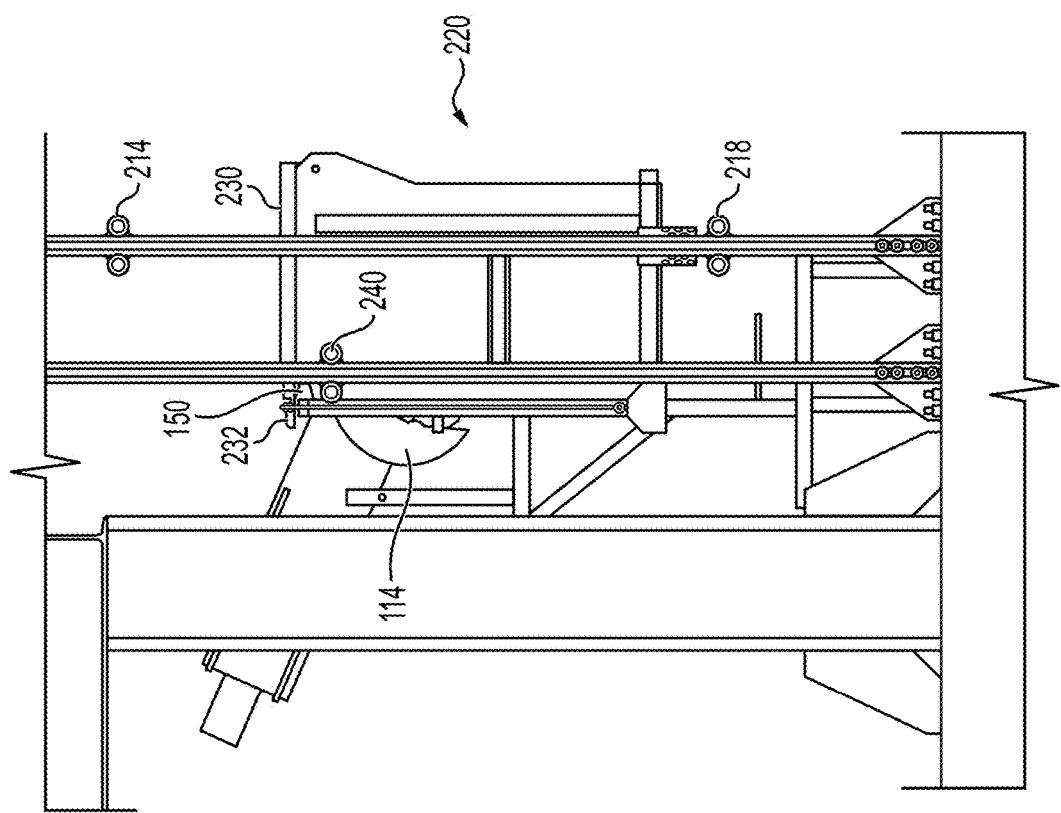
FIG. 3K is a side view illustrating the pre-skip subsystem of FIG. 3A.

However, in the state illustrated in FIG. 3L, the skip 200 has not fully reached the pre-skip 100 loading area. This is indicated by the lid 230 being only partially open and the chute 114 still being closed. FIG. 3I illustrates the skip 200 properly positioned in the pre-skip 100 area, as shown by the wider opening angle of the lid 230 and the chute 114 being open and positioned over the opening of the skip 200 to enable the flow of particles into the interior 224 of the skip 200.

The hopper 400 is configured to receive the contents of the skip container 220 inside. To facilitate the unloading of the skip 200 into the hopper 400, the rails 300 are shaped to insert the top end of the skip container 220 inside of a front receiving face of the hopper 400 while turning the container 220 upside down so that its contents can be dumped into the hopper 400 by virtue of gravity. This configuration will be described in more detail below.

Figure 6B:
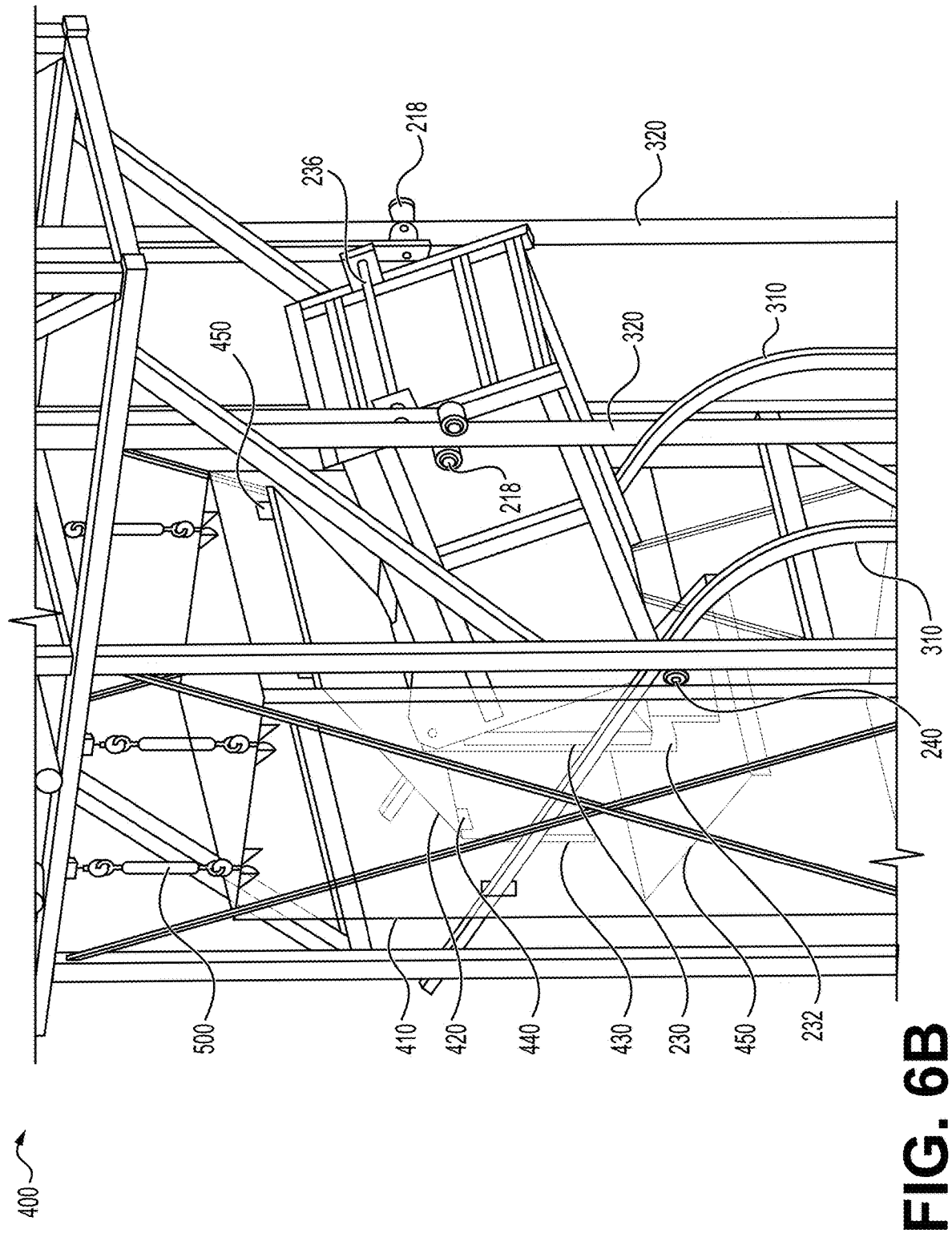
FIG. 6B is a perspective view illustrating the upper hopper of the skip hoist system of FIG. 1.
Figure 6C:
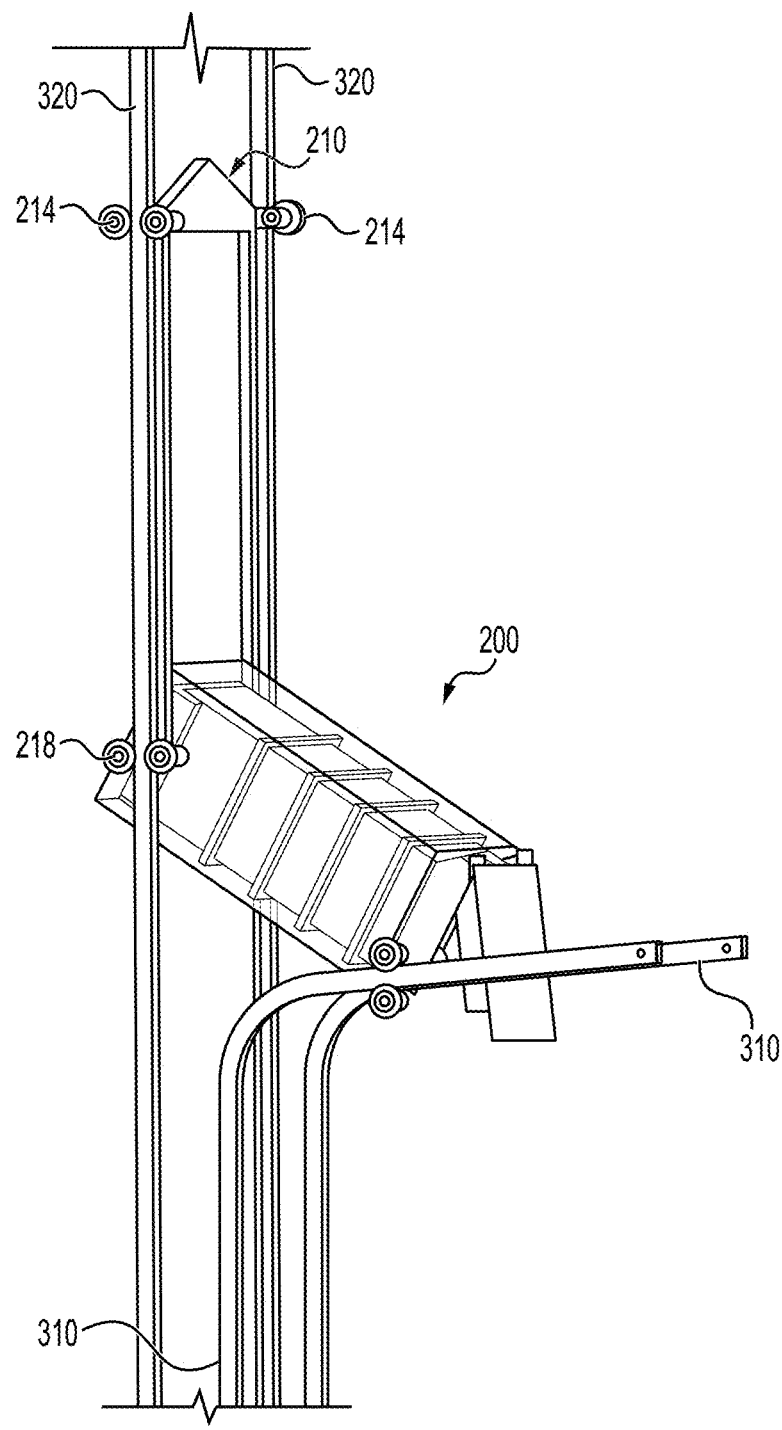
FIG. 6C is a perspective view illustrating some components of the skip hoist system of FIG. 1 in isolation.

The insertion process of the skip 200 into the hopper 400 is more clearly illustrated in FIGS. 6A-6C. Referring to FIGS. 6A and 6B, the plurality of rails 300 may include a pair of front rails 310 and a pair of rear rails 320. The rollers 240 of the skip 200 are connected to the front rails 310. All of the rollers 214 and 218 of the bail 200 are connected to the rear rails 320 (see FIG. 6C).

As illustrated in FIG. 6B, the curvature (or bending) of the front rails 310 in front of the hopper 400, and the upwardly extending rear rails 320 in combination with the pivoting action between the bail 210 and the skip container 220 enable the lid the lid 230 to pivotally open by virtue of gravity when the lid 230 is inserted inside of the hopper 400. This is so because the bottom end of the skip 200 is lifted above the lid 230 when the lid 230 is inserted in the hopper 400, as illustrated in FIG. 6B. The arrangement of the skip 200 relative to the rails 300 when inserted in the hopper 400 is illustrated in FIG. 6C (which omits the hopper 400 for clarity purposes).

The portion of each rail 310 that extends inside of the hopper 400 and partially outside the front of the hopper 400 is not horizontal. In other words, said part of the rails 310 is inclined by a certain amount upwardly relative to a horizontal axis in the direction in which the skip 200 enters the hopper 400, as illustrated in FIGS. 6A-6C. This configuration allows the skip 200 to smoothly accelerate on the downward path (e.g., toward the pre-skip 100) and smoothly decelerate on the upward path (e.g., toward the inside of the hopper 400).

The configuration of the rails 310 and 320, in which all of the rollers of the bail 210 engage only the rails 320 and all of the rollers of the skip container 220 engage only the rails 310, eliminates a potentially troublesome mechanism that would otherwise be needed to unlatch the bail 210 from the skip container 220 when the skip container 220 is overturned to empty the particulate into the upper hopper 400. In addition, the configurations of the rails 310 and 320, in combination with the attachment of the rollers 214, 218 and 240 thereon, as described in this specification, eliminates the otherwise disadvantageous configuration in which both pairs of rails would need to extend the entire height of the lift.

While the rails 310 and 320 are illustrated as running in pairs, the system of the present disclosure can be modified to utilize less than two front rails 310, more than two front rails 310, less than one two rear rails 320, more than two rear rails 320, or a combination thereof. The number and placement of the rollers of the skip 200 would then be modified based on the number of rails utilized to operate the skip 200 in accordance with the teachings of this specification.

In addition, while this specification teaches the use of rollers for connecting the skip 200 with the rails 300, other connection mechanisms may be used to movably connect the skip 200 with the rails 300. These mechanisms may include, for example, a slidable coupling between the skip 200 and the rails 300, or a combination of sliding and rolling components.

The hopper 400 is insulated and may be equipped with a dual component door in order to accommodate the top side of the skip 200 entering therethrough and to automatically close by virtue of its own weight when the skip 200 is withdrawn from the interior of the hopper 400.

More specifically, as illustrated in FIGS. 6A and 6B, the hopper 400 may include an insulated housing 410 having a front door with a first door component 420 and a second door component 430 pivotally connected to one another by one or more hinges 440. The first door component 420 is pivotally connected to a top portion of the front wall of the hopper 400 and the bottom part of the second door component 430 is free to move relative to the housing 410. The hopper 400 may have a weighted door and a silicon carbide foam filter inside of the housing 410.

As more clearly illustrated in FIG. 6B, the hopper 400 may be connected to the structure of the skip hoist system (or to the structure of the power plant) solely by load cells (a plurality of load cells 500 as exemplarily illustrated in FIG. 6B). The load cells 500 can be utilized in real-time to measure the weight of the hopper assembly 400. Therefore, the weight of each load of particles dumped into the hopper 400 can be determined in real-time. This information can then be used to track the operation of the power plant in real-time, and, when needed, to adjust its operating parameters accordingly. Alternatively, a single load cell can be used to connect the hopper 400 to the structure of the skip hoist system or the power plant.

A power plant utilizing the system of the present invention may include a particle heating receiver (PHR). The hopper 400 may include a silicon carbine foam filter to prevent contamination of the PHR with large particles. Since the hopper 400 receives particles intermittently, it can also function as a mass flow measuring and monitoring bin. This feature provides a valuable solution to address the challenge of measuring the mass flow of hot particulates for data acquisition, performance monitoring, and control purposes. By integrating the weighing function into the upper hopper 400, the system of the present disclosure offers a practical means to measure and monitor the mass flow of hot particles. This information is crucial for effective data acquisition, performance analysis, and control of the power plant.

The housing 410 hopper 400 may include two chambers (separated by a component 450 as illustrated in FIG. 6B), an inner liner and a cladding. The inner volume of the hopper 400 may be about 50% greater than the inner volume of the skip 200. In other words, the hopper 400 can be used as inventory of particulate. To reduce conductive heat loss, the in-between volume of the hopper 400 may be filled with mineral wool or other insulating material.

Figure 7A:
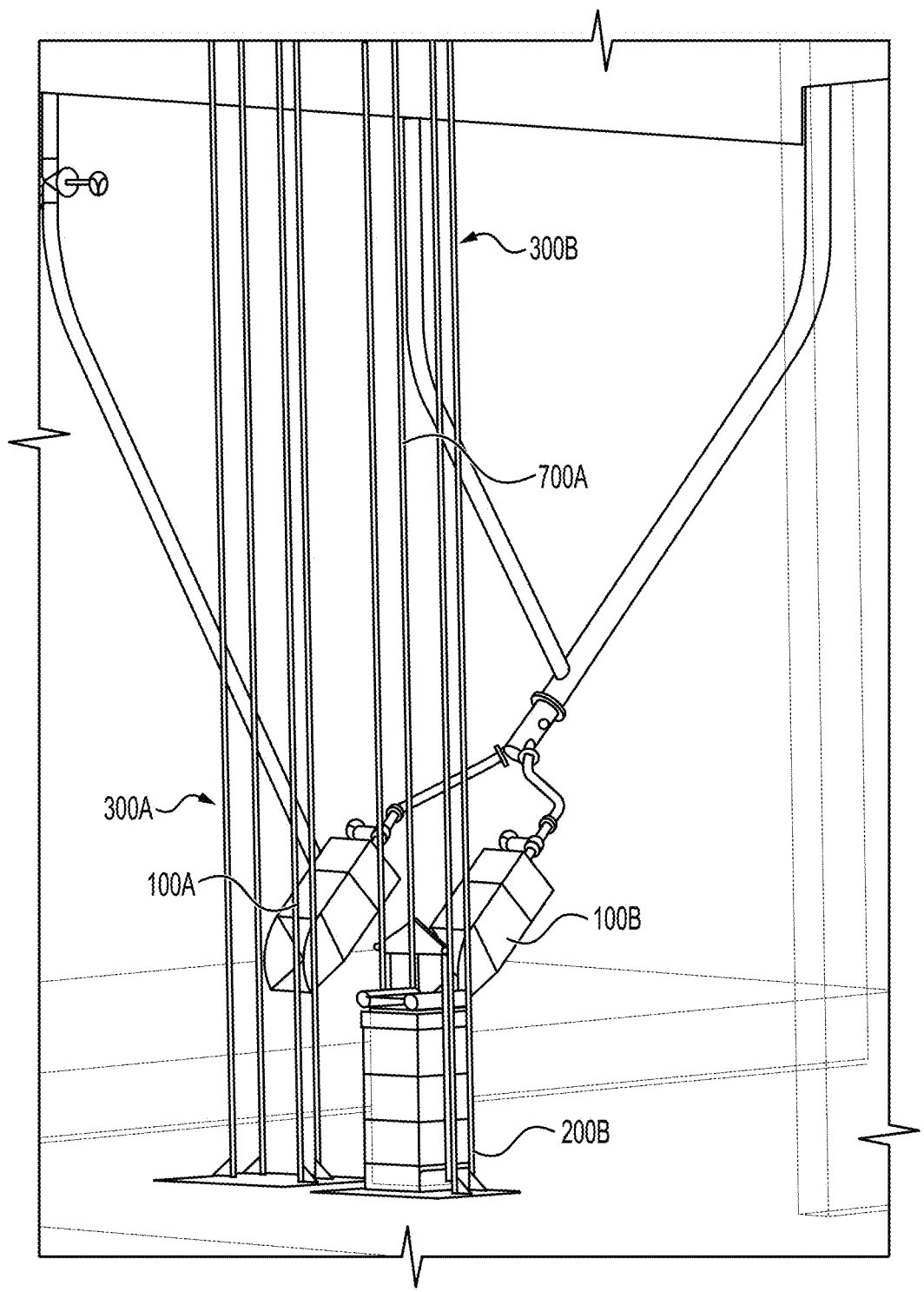
FIG. 7A is a perspective view illustrating a lower portion of a dual skip hoist system for a particle-based high-temperature power tower plant according to an embodiment of the present invention.
Figure 7B:
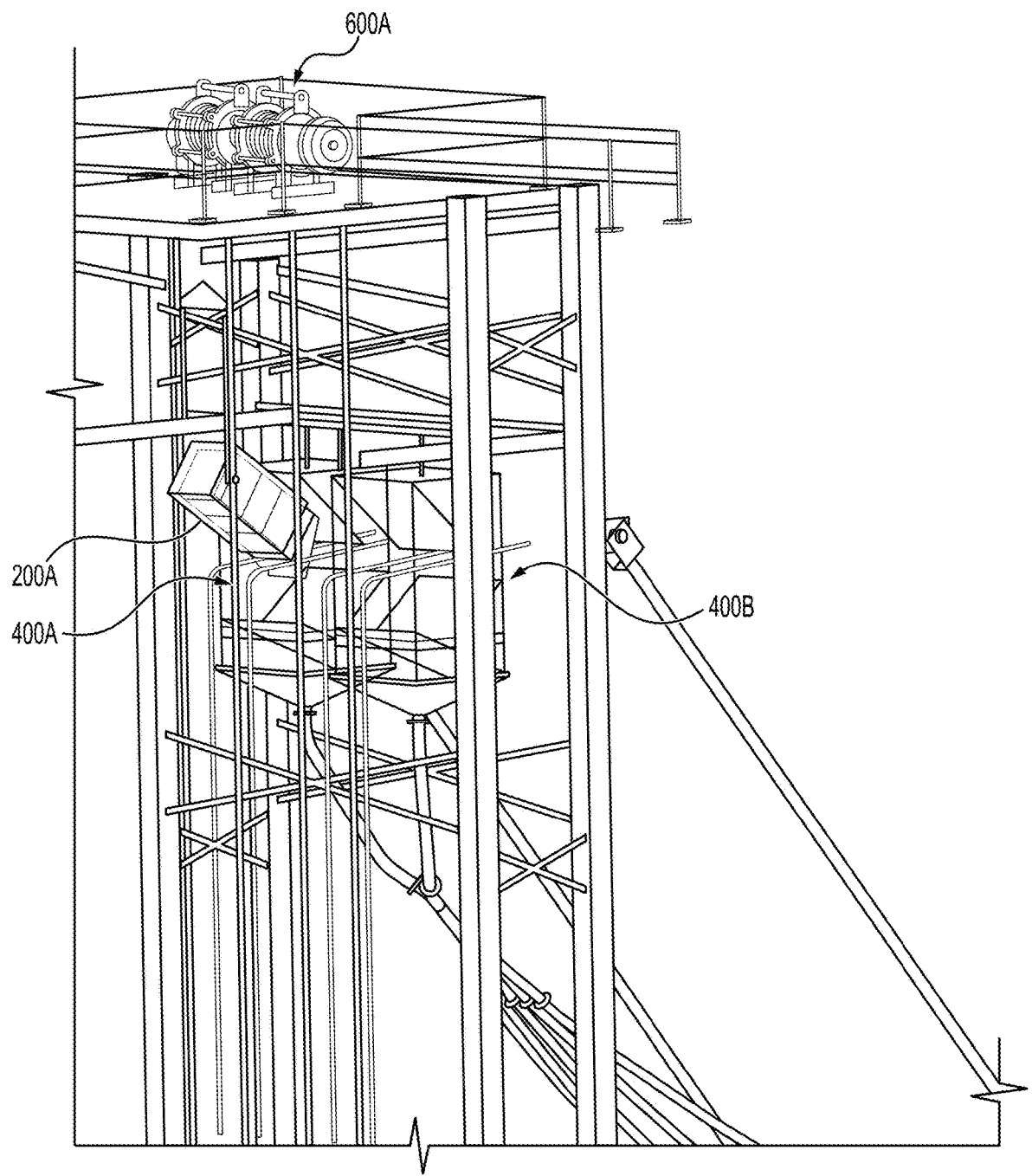
FIG. 7B is a perspective view illustrating a top portion of the dual skip hoist system of FIG. 7A.

The present inventive concept can also be embodied in a skip system that utilizes a plurality of pre-skips, a plurality of skips, and a plurality of upper hoppers. FIGS. 7A and 7B illustrate such an example. Components/features of the embodiment of FIGS. 7A and 7B that are not described in detail below may be assumed to be similar to or the same as corresponding component/features of a skip system as described elsewhere in this specification. Therefore, only the differences between the embodiment of FIGS. 1-6C and the embodiment of FIGS. 7A-7B will be described below.

More particularly, FIGS. 7A and 7B illustrate a funicular skip hoist system. Referring to FIGS. 7A and 7B, a skip hoist system for a particle-based high-temperature power tower plant may include first and second pre-skips 100A and 100B arranged side-by-side, first and second upper hoppers 400A and 400B arranged side-by side above the pre skips 100A and 100B, first and second groups of rails 300A and 300B respectively connecting the pre-skip 100A with the hopper 400A and the pre-skip 100B with the hopper 400B, first and second skips 200A and 200B respectively riding along the rails 300A and 300B, a cable 700A, and at least one winder 600A.

The cable 700A may have one of its two ends connected to the skip 200A and the other end connected to the skip 200B. The cable 700A may be powered by at least one winder 600A in order to move the skips 200A and 200B along their respective rails.

As illustrated in FIGS. 7A and 7B, due to the funicular design, when one skip is positioned to dump its contents into its respective upper hopper (as the skip 200A is illustrated in FIG. 7B), the other skip is positioned in its corresponding pre-skip loading area (as the skip 200B is illustrated in FIG. 7A). The funicular configuration of the skip hoist system of the present invention is advantageous because it increases the operating efficiency of the system. This is so because the rate of particles moved by the skips 200A and 200B is about double the rate of system that utilizes a single skip but without significantly increasing the power utilized by the winder to move the skips 200A and 200B. This is so because, due to the funicular arrangement, the weights of the skips 200A and 200B cancel themselves out (presuming the skips 200A and 200B have the same empty weight), therefore, the power of the winder is used mainly to move the load carried by one of the two skips at a time.

Of course, the present invention is not limited to a funicular configuration when utilizing two or more skip hoist systems. Two or more skip hoists system of the present invention can be installed in the same tower power plant and can be operated independently of one another.

While the present invention has been particularly shown and described with reference to exemplary embodiments thereof, it will be apparent to those of ordinary skill in the art that various changes in form and detail may be made therein without departing from the spirit and scope of the present invention as defined by the following claims.

What is claimed is:

1. A skip hoist particle lift system for a particle-based power tower plant, the skip hoist particle lift system comprising:
 a pre-skip subsystem, the pre-skip subsystem including a container configured to accumulate an amount of particles therein;
 an upper hopper disposed above the pre-skip subsystem and separated therefrom;
 a plurality of elongated guide rails connecting the pre-skip subsystem and the upper hopper to one another; and
 a skip subsystem mounted on the elongated guide rails and configured to be moved therealong between the pre-skip subsystem and the upper hopper,
 wherein the pre-skip subsystem is configured to automatically release the accumulated amount of particles into the skip subsystem when the skip subsystem is brought into a loading position at the pre-skip subsystem, wherein the skip subsystem, when loaded with the particles, is configured to be moved upwardly in order to transport the loaded particles to the upper hopper, and
 wherein the pre-skip subsystem further comprises:
  a chute pivotally connected to a particle discharge end of the container, wherein the chute is configured to be pivoted between an open state, in which the chute enables the accumulated particles to be discharged into the skip subsystem when the skip subsystem is brought to the loading position, and a closed state, in which the chute prevents particles from being released from the particle discharge end of the container when the skip subsystem is moved away from the loading position; and
  a door slidably engageable with an outer surface of the chute, opposite to the container of the pre-skip subsystem, wherein the door is configured to slide upwardly and downwardly along different elevations, and wherein the door is configured to slide between a first elevation, in which the door rests against the chute and keeps the chute closed by virtue of resting thereagainst, and a second elevation, lower than the first elevation, which enables the chute to be pivoted to the open state.

2. The system of claim 1, wherein the pre-skip subsystem further includes a platform and a connecting element connecting the platform with the door, wherein the platform is configured to engage the skip subsystem and to be lowered by the skip subsystem when the skip subs-system is moved downwardly toward the loading position in order to move moving the door into the lower second elevation.

3. The system of claim 1, wherein the pre-skip subsystem further includes at least one weight, an elongated flexible connector having one end thereof connected to the door and the other end thereof connected to the at least one weight, and a pulley, wherein the flexible connector passes through the pulley, and wherein, when the skip subsystem is raised upwardly from the loading position, the at least one weight is configured to pull the door upwardly to the first elevation, via the flexible connector, whereby the door closes the chute and maintains the chute closed.

4. The system of claim 1, wherein the pivoting connection between the chute and the particle discharge end of the container of the pre-skip subsystem includes a longitudinal pivoting shaft, and the pre-skip subsystem further includes a sealing strip disposed on the longitudinal pivoting shaft in order to reduce or prevent particles from coming into contact with the longitudinal pivoting shaft.

5. The system of claim 1, wherein the pre-skip subsystem further includes at least one protrusion fixed to a structural component thereof above the particle discharge end of the pre-skip container, the protrusion extending toward the plurality of rails,
   wherein the skip subsystem includes a container having a storage area therein for receiving the particles accumulated in the pre-skip container, the storage container of the skip subsystem having a hollow body with a hinged lid at its top end, the hinged lid having a protrusion that extends past a front wall of said storage container in a direction toward the at least one protrusion of the pre-skip subsystem, and
   wherein the at least one protrusion of the pre-skip subsystem is configured to engage the protrusion of the lid as the skip subsystem descends toward the loading position of the pre-skip subsystem and to cause the lid to rotate to an open position when the skip subsystem continues its descend subsequent to the engagement of the at least one protrusion of the pre-skip subsystem and the protrusion of the lid.

6. The system of claim 1, wherein the skip subsystem further includes a bail and a container configured to receive the particles from the pre-skip subsystem therein, wherein the bail and the container of the skip subsystem are hingedly connected to one another.

7. The system of claim 6, wherein the plurality of rails includes a front rail having a top region that bends toward a front door of the upper hopper, and a rear rail that extends upwardly beyond an elevation of the front door of the upper hopper,
   wherein the container of the skip subsystem is movably connected to the front rail and the bail is movably connected to the rear rail.

8. The system of claim 1, further comprising at least one load cell connected to the upper hopper and configured to read a weight of the upper hopper.

9. The system of claim 1, wherein the container of the pre-skip subsystem further includes a diaphragm disposed inside a storage area for reducing a filling rate of said container with particles.

10. A skip hoist particle lift system for a particle-based power tower plant, the skip hoist particle lift system comprising:
   a pre-skip subsystem;
   an upper hopper disposed above the pre-skip subsystem;
   a plurality of rails connecting the pre-skip subsystem and the upper hopper to one another;
   a skip subsystem connected to the plurality of rails and configured to be moved therealong between the pre-skip subsystem and the upper hopper;
   a winder; and
   a cable being connected to the winder and to the skip subsystem for moving the skip subsystem along the rails,
   wherein the pre-skip subsystem includes:
   a storage container configured to accumulate particles therein, the storage container having a discharging end for discharging the stored particles therefrom,
   a chute rotatably coupled to the discharging end of the storage container, the chute being rotatable between a closed position, in which the chute closes the discharging end of the storage container, and an open position, in which the chute opens the discharging end of the storage container, and
   a weight-and-pulley assembly comprising:
       a plate mounted on supporting rails to slide upwardly and downwardly along said supporting rails, the plate having an up/down range of motion that spans from above an elevation of a pivoting joint of the rotatable chute to below the elevation of the pivoting joint of the chute, wherein, when the chute is in the closed position, the plate rests against the chute, opposite to the storage container of the pre-skip subsystem, and is configured to press the chute against the discharging end of the storage container of the pre-skip subsystem in order to keep said discharging end closed;
       a weight spaced apart from the plate;
       a pulley disposed above the pivoting joint of the chute; and
       a cable having a first end thereof attached to the weight, a second end thereof attached to the plate, and an elongated body extending between the first and second ends thereof, the elongated body of the cable passing through the pulley.

11. The system of claim 10, wherein the joint of the chute is disposed at a bottom of the discharging end of the pre-skip subsystem storage container.

12. The system of claim 10, wherein the pre-skip subsystem further includes at least one protrusion fixed to a structural component above the discharging end of its container, the protrusion extending toward the plurality of rails,
   wherein the skip subsystem includes a container having a storage area therein for receiving the particles accumulated in the pre-skip storage container, the storage container of the skip subsystem having a body with a hinged lid at its top end, the hinged lid having a protrusion that extends past a front wall of said storage container in a direction toward the at least one protrusion of the pre-skip subsystem, and
   wherein the at least one protrusion of the pre-skip subsystem is configured to engage the protrusion of the lid as the skip subsystem descends toward a loading position of the pre-skip subsystem and to cause the lid to rotate to an open position when the skip subsystem continues its descend subsequent to the engagement of the at least one protrusion of the pre-skip subsystem with the protrusion of the lid.

13. The system of claim 10, wherein the pre-skip subsystem further includes a platform and a connecting element connecting the platform with the movable plate of the weight-and-pulley assembly, wherein the platform is configured to engage the skip subsystem and to be lowered by the skip subsystem when the skip subsystem is moved downwardly toward the loading position in order to move the plate downwardly at or below the elevation of the joint of the chute.

14. The system of claim 10, wherein the skip subsystem further includes a bail hingedly connected to the container of the skip subsystem.

15. The system of claim 14, wherein the plurality of rails includes a front rail having an upper region that bends toward a front door of the upper hopper, and a rear rail that extends upwardly beyond an elevation of the front door of the upper hopper.

16. The system of claim 15, wherein a bent top region of the front rail extends at a non-zero slope relative to the horizon.

17. The system of claim 15, wherein the bail includes a plurality of rollers attached along a length thereof, said rollers being connected to the rear rail, and the container of the skip subsystem further includes at least one roller attached adjacent to a front side thereof and connected to the front rail.

18. A skip hoist particle lift system for a particle-based power tower plant, the skip hoist particle lift system comprising:
    first and second pre-skip subsystems;
    first and second upper hoppers disposed above the first and second pre-skip subsystems, respectively;
    a first set of rails connecting the first pre-skip subsystem with the first upper hopper, and a second set of rails connecting the second pre-skip subsystem with the second upper hopper;
    a first skip subsystem connected to the first set of rails and configured to be moved therealong between the first pre-skip subsystem and the first upper hopper, and a second skip subsystem connected to the second set of rails and configured to be moved therealong between the second pre-skip subsystem and the second upper hopper;
    a winder; and
    a cable being connected to the winder, to the first skip subsystem and to the second skip subsystem, the cable being configured to move the first and second skip subsystem in a funicular configuration via power supplied by the winder;
    wherein each of the first and second pre-skip subsystems includes:
    a storage container configured to accumulate hot particles therein, the storage container having a discharging end and being configured to intermittently discharge the particles therefrom,
    a chute rotatably coupled to the discharging end of the storage container, the chute being rotatable between a closed position, in which the chute closes the discharging end of the storage container, and an open position, in which the chute opens the discharging end of the storage container, and
    a weight-and-pulley assembly comprising:
        a plate mounted on supporting rails and configured to slide upwardly and downwardly along said supporting rails, the plate having a range of motion that spans vertically from above an elevation of a pivoting joint of the rotatable chute to below the elevation of the pivoting joint of the chute, wherein, when the chute is in the closed position, the plate rests against an exterior of the chute and is configured to press the chute against a discharge end of the storage container of the pre-skip subsystem in order to keep said discharge end closed;
        a weight spaced from the plate;
        a pulley disposed above the pivoting joint of the chute; and
        a cable having a first end thereof attached to the weight, a second end thereof attached to the plate, and an elongated body extending between the first and second ends thereof, the elongated body passing through the pulley.

* * * * *